(12) United States Patent
Morrison

(10) Patent No.: US 11,923,748 B2
(45) Date of Patent: Mar. 5, 2024

(54) COOLING PLATE SYSTEM, METHOD AND APPARATUS FOR CLEAN FUEL ELECTRIC VEHICLES

(71) Applicant: Alakai Technologies Corporation, Hopkinton, MA (US)

(72) Inventor: Brian D. Morrison, Hopkinton, MA (US)

(73) Assignee: Alakai Technologies Corporation, Stow, MA (US)

(*) Notice: Subject to any disclaimer, the term of this patent is extended or adjusted under 35 U.S.C. 154(b) by 567 days.

(21) Appl. No.: 17/063,578

(22) Filed: Oct. 5, 2020

(65) Prior Publication Data

US 2021/0104935 A1 Apr. 8, 2021

Related U.S. Application Data

(60) Provisional application No. 62/912,390, filed on Oct. 8, 2019.

(51) Int. Cl.
*H02K 5/20* (2006.01)
*B64D 33/08* (2006.01)
(Continued)

(52) U.S. Cl.
CPC ............ *H02K 5/225* (2013.01); *B64D 33/08* (2013.01); *H02K 5/20* (2013.01); *H02K 9/197* (2013.01)

(58) Field of Classification Search
CPC ............ H02K 5/20; H02K 5/203; H02K 5/22; H02K 5/225; H02K 9/19; H02K 9/193; H02K 9/197; B64D 33/08; B64D 33/10
See application file for complete search history.

(56) References Cited

U.S. PATENT DOCUMENTS

| 5,616,973 A | * | 4/1997 | Khazanov | H02K 5/203 310/58 |
| 6,160,332 A | * | 12/2000 | Tsuruhara | H02K 5/203 310/58 |

(Continued)

FOREIGN PATENT DOCUMENTS

| CN | 104485794 A | * | 4/2015 |
| CN | 104716786 B | * | 3/2017 |

(Continued)

OTHER PUBLICATIONS

Yu, Machine Translation of CN106899134, Jun. 2017 (Year: 2017).*
(Continued)

*Primary Examiner* — Eric Johnson
(74) *Attorney, Agent, or Firm* — Morse, Barnes-Brown & Pendleton, P.C.; Sean D. Detweiler, Esq.

(57) ABSTRACT

An improved efficiency cooling plate apparatus for full-scale clean fuel electric-powered aircraft having a cooling body including a plurality of bores, apertures and interior chambers working together to process and circulate fluid coolant and function as a heat sink device, interconnecting with the cooling system of an electric motor and cooperatively functioning to transfer thermal energy away from the electric motor using conduction, convection and radiation, while transporting heated fluid coolant away from heated motor components and to other components of a vehicle for further processing, then returning cooled fluid coolant into the cooling system of an electric motor, effectively partitioning heated fluid coolant, cooled fluid coolant, and electrical circuitry in a space saving design formed from a single part or minimal number of parts to reduce modes of failure and reduce required fasteners or connections to improve robustness and reliability while maintaining suitable aerodynamic characteristics.

35 Claims, 28 Drawing Sheets

(51) Int. Cl.
*H02K 5/22* (2006.01)
*H02K 9/197* (2006.01)

(56) References Cited

U.S. PATENT DOCUMENTS

| | | | |
|---|---|---|---|
| 6,220,046 B1 * | 4/2001 | Kristen | H02K 11/33 62/434 |
| 9,242,728 B2 | 1/2016 | Morrison | |
| 9,764,822 B2 | 9/2017 | Morrison | |
| 2012/0083945 A1 | 4/2012 | Oakley et al. | |
| 2013/0259720 A1 | 10/2013 | Mills et al. | |
| 2014/0232217 A1 * | 8/2014 | Miyama | H02K 11/33 310/68 D |
| 2014/0239750 A1 | 8/2014 | Nagao et al. | |
| 2014/0239755 A1 | 8/2014 | Nagao et al. | |
| 2018/0200823 A1 * | 7/2018 | Huang | H02K 19/16 |
| 2019/0165653 A1 * | 5/2019 | Gu | H02K 11/33 |
| 2021/0071676 A1 * | 3/2021 | Staehle | H02K 5/203 |

FOREIGN PATENT DOCUMENTS

| | | | |
|---|---|---|---|
| CN | 106899134 A | * | 6/2017 |
| DE | 3738592 C1 | * | 5/1989 |
| DE | 102017222822 A1 | | 6/2019 |
| WO | WO-2014194060 A1 | * | 12/2014 |
| WO | WO-2017/018578 A1 | | 2/2017 |

OTHER PUBLICATIONS

Zelle, Machine Translation of DE3738592, May 1989 (Year: 1989).*
Zhang, Machine Translation of CN104485794, Apr. 2015 (Year: 2015).*
Chen, Machine Translation of CN104716786, Mar. 2017 (Year: 2017).*
International Search Report from PCT/US2020/054313, dated Jan. 11, 2021.

* cited by examiner

COOLING PLATE SYSTEM, METHOD AND APPARATUS FOR CLEAN FUEL ELECTRIC VEHICLES

CROSS-REFERENCE TO RELATED APPLICATION(S)

This application claims priority to, and the benefit of, U.S. Provisional Application No. 62/912,390, filed Oct. 8, 2019, for all subject matter common to both applications. The disclosure of said provisional application is hereby incorporated by reference in its entirety.

FIELD OF THE INVENTION

The present invention is directed to an improved efficiency cooling plate apparatus, system, and method. It finds particular, although not exclusive, application to electric-powered aircraft and is suited for implementation in electric motors for vertical takeoff and landing (VTOL) multirotor aircraft configurations as well as fixed wing and other conventional propeller applications, including Advanced Air Mobility (AAM) aircraft, where the fuel-cell modules or other on-board sources of power transforms hydrogen and oxygen or other suitable energy-storage materials into electricity that is then used to operate one or more electric motors, depending upon the application and architecture. The cooling plate apparatus, system, and method include a cooling body comprising a plurality of bores, apertures and interior chambers working together to process fluid coolant and function as a heat sink and coolant circulation device, interconnecting with the body or cooling system of an electric motor and cooperatively functioning to transport heated fluid coolant away from electric motor components, dissipating heat generated by rotor-current or stator-current flowing through the electric motor to produce torque. The cooling plate apparatus transfers heat or thermal energy away from the electric motor using conduction, convection and radiation, while transporting fluid coolant to other components of a vehicle for further processing, then returning cooled fluid coolant into the cooling system of an electric motor, effectively partitioning heated fluid coolant, cooled fluid coolant, and electrical circuitry in a space saving design formed from a single part or minimal number of parts to reduce modes of failure and reduce required fasteners or connections to improve robustness and reliability while maintaining suitable aerodynamic characteristics to improve motor function and efficiency.

BACKGROUND

Although reduced scale multirotor aircraft (sometimes called multi-copters) are not new, they have been reduced scale models not intended for the rigors or requirements of carrying human passengers, and find use mostly either as toys, or for limited-duration surveillance or aerial photography missions with motion being controlled by radio-control remotes. As a result, these devices generally rely upon only unsophisticated power production systems that include electric motors, basic batteries, and heat sinks, without having any of the radiators, fluids (often referred to as coolant), cooling fans, or monitoring devices for cooling systems that passenger carrying powered vehicles commonly provide. For example, US Patent Application 20120083945 relates specifically to a reduced scale multi-copter, but does not address the safety, structural, or redundancy features necessary for FAA-certified passenger-carrying implementations, nor any of the systems required to implement a practical, passenger-carrying vehicle with fault-tolerance and state-variable analysis. The dynamics and integrity requirements of providing a full-scale aircraft capable of safely and reliably carrying human passengers and operating within US and foreign airspace are significantly different that those of previous reduced scale models.

Generally, powered vehicles need to dissipate waste heat from various systems and subsystems those vehicles use, including heat from the friction of moving parts and waste heat generated by producing horsepower or shaft torque using rotor-current or stator-current. For example, in brushless DC motors, a rotor can include permanent magnets that generate a DC magnetic field (from the perspective of the rotor). That magnetic field interacts with currents flowing within the windings of the stator core (made up of stacked laminations) to produce a measurable torque between the rotor and stator, resulting in rotation. As the rotor rotates, magnitude and polarity of the stator currents are continuously varied such that torque remains near constant and conversion of electrical to mechanical energy is efficient, with current control performed by an inverter (e.g. 3-phase modulating inverter or similarly functioning digital controllers). This rotation of the rotor and conversion of energy at less than perfect efficiency create waste heat, and heated parts increase physical dimensions, leading to added friction in contacting and rotating parts, adding more heat. Heat also increases electrical resistance to the continued flow of current thus impacting efficiency, where greater resistance in the flow of current also generates additional heating of parts and components. Aircraft, automobiles, powered boats and other vehicles often use radiators to dissipate the waste heat of power generation.

Whether vehicles use motors, batteries, fuel cells, engines, generators or other means to propel, control, steer or monitor vehicle travel, these components generate excess heat that must be managed and dissipated from the system to prevent overheating and maintain efficient operating temperatures. Often, heat is transferred away from components that generate excess heat using a fluid. One way to do this is to use airflows, either natural or induced via cooling fans, which move air heated from the component into the cooler external atmosphere. Reduced scale devices generally rely upon only unsophisticated heat management systems that include basic passive heat sinks or motor frames and housings with cast or molded fins that increase surface area to dissipate heat the same way that computers and other common electronic devices do, without having even the radiators, fluids (often referred to as coolant), cooling fans, or monitoring devices for cooling systems that passenger carrying powered vehicles commonly provide. Another common method is to use a liquid flow that moves through components, heating as it travels in a circuit to a cooler region, thereby lowering component temperatures as it circulates through heat generating systems. Using both radiation of heat into the external environment and a reservoir of cold fluid improves the overall efficiency of the system and the ability to adjust to a range of different dynamic conditions, but it requires a more sophisticated system to implement thermodynamic principles to achieve the required parameters.

A heat sink transfers thermal energy from a higher temperature device to a lower temperature fluid medium. The fluid medium may be air, water, refrigerants or oil. In thermodynamics a heat sink is defined as a heat or thermal energy reservoir that can absorb a large amount of heat or thermal energy without significantly changing temperature.

For example, the atmosphere or an ocean may serve as a heat sink. A heat source is a heat reservoir or thermal energy reservoir that can supply large amounts of energy without undergoing a significant change in temperature. Practical heat sinks for electronic devices must have a temperature higher than the surroundings to transfer heat by convection, radiation, and conduction. The power supplies of electronics are not perfectly efficient, and are subject to electrical resistance, so extra heat is produced that may be detrimental to the function of the device. As such, a heat sink is often included in the design to disperse heat.

The principle of a heat sink operates according to Fourier's law of heat conduction: when there is a temperature gradient in a body, heat will be transferred from the higher temperature region to the lower temperature region. The rate at which heat is transferred by conduction is proportional to the product of the temperature gradient and the cross-sectional area through which heat is transferred. Newton's law of cooling states, the rate of heat loss (cooling) of an object (whether by conduction, convection, or radiation) is approximately proportional to the temperature difference ΔT between the body and its surroundings. Heat sinks transfer heat or thermal energy from electronic devices producing excess heat to the periphery of the heat sink when in contact with a cooler surrounding environment, and then lose that excess heat to the surrounding environment, thereby cooling the electronic devices.

Conversely, heat pumps move thermal energy in the opposite direction of spontaneous heat transfer, by absorbing heat from a cold space and releasing it to a warmer one. A heat pump uses a small amount of external power to accomplish the work of transferring energy from the heat source to the heat sink. A heat sink is a passive heat exchanger that transfers the heat generated by an electronic or a mechanical device to a fluid medium, often air or a liquid coolant, where it is dissipated away from the device, thereby allowing regulation of the device's temperature at optimal levels. A heat pump is a machine or device that moves heat from a source location at a lower temperature to a heat sink location at a higher temperature using mechanical work or a high-temperature heat source. A heat pump may function as a "heater" if the objective is to warm the heat sink, or a "refrigerator" if the objective is to cool the heat source. In either case, the operating principles are identical. Heat is transferred from a relatively cooler place to a relatively warmer place. One way to interconnect objects in need of cooling with objects in need of heating when those objects cannot be physically joined is by using a heat exchanger and working fluids. A fluid heat recovery apparatus, commonly known as a heat exchanger, is a device that transfers heat between one or more mediums. Liquid heat transfer is the most common medium used in heat exchangers, with gas mediums also used within different applications. Fluids (liquids, gases and air) can be separated by an enclosed area or in direct contact in the heat exchanger. Fluids in this application are defined in accordance with conventional meanings as substances such as liquids or gases that are capable of flowing and can change shape when acted upon by a force. The flow of fluids can be directed from different sources to different destinations, allowing heat exchangers to perform heat transfer for a variety of objects remote from each other.

The dynamics and integrity requirements of providing a full scale electric aircraft capable of safely and reliably carrying human passengers are significantly different that those of reduced scale models. Such a vehicle requires state-of-the-art electric motors, electronics and computer technology with high reliability, safety, simplicity, and redundant control features, coupled with advanced avionics and flight control techniques. Generating and distributing electrical power aboard a vehicle (e.g. from one or more fuel cells to one or more motors or motor controllers) presents several challenges including inefficient performance, waste heat generation and dissipation rates, system complexity related to maintenance, errors and failures, and constraints related to space, weight, aerodynamics, and safety, requiring a more efficient method to implement the relevant electromagnetic, chemical reaction, and thermodynamic principles in a variety of settings and conditions to achieve viable flight performance.

SUMMARY

There is a need for an improved lightweight, highly efficient, fault-tolerant cooling plate system, method, and apparatus to augment motor cooling, especially in conjunction with power generation subsystems for a full-scale, clean fuel, electric-powered VTOL aircraft that leverages advantageous characteristics in its design to improve efficiency and effectiveness in managing and distributing heat or thermal energy produced from the generation of electrical power (voltage and current) to dynamically meet needs of an aircraft without compromising other functionalities, and to maintain one or more motors at preferred operating conditions (e.g. temperatures) for proper vehicle performance. Further, there is a need to simultaneously dissipate waste heat from power generating systems and prevent power and electrical systems from overheating, while limiting the number, mass, and size of systems used within an aircraft due to restrictions on the volume and mass of the vehicle required by flight parameters that must be adhered to in order to successfully maintain aircraft flight. The present invention is directed toward further solutions to address these needs, in addition to having other desirable characteristics. Specifically, the present invention relates to a method and apparatus for managing thermal energy produced by the generation and distribution of electrical power using fuel cell modules in a full-scale vertical takeoff and landing manned or unmanned aircraft having a multirotor airframe fuselage containing a system to generate electricity from fuels such as hydrogen as part of the design of a full-scale, clean-fueled, electric vehicle, particularly a full-scale multirotor aircraft, also referred to herein as a multirotor aircraft, a Personal Air Vehicle (PAV) or an Air Mobility Vehicle (AMV) such as the invention described in U.S. Pat. No. 9,764,822, as well as U.S. Pat. No. 9,242,728, each incorporated by reference herein.

In accordance with example embodiments of the present invention, a cooling plate apparatus includes a cooling body comprising a top wall offset in an axial direction from a base wall; a hub wall interposed between the top wall and the base wall; and a perimeter wall offset from the hub wall at a greater offset distance from a central axis than the hub wall. The perimeter wall is interposed between the top wall and the base wall, connecting a perimeter of the top wall to a perimeter of the base wall. The top wall, the base wall, the hub wall, the perimeter wall and the cooling body each include a heat conducting material. The cooling plate includes an interior fluid cavity configured to hold and circulate fluid coolant (e.g. liquids or gases). The interior fluid cavity is defined by and disposed within an interior surface of the hub wall, an interior surface of the top wall, an interior surface of the base wall, and an interior surface of the perimeter wall. At least one partition wall is interposed between the top wall and the base wall. The partition wall is configured to separate portions of the interior fluid cavity and enable a directional flow through the interior fluid cavity. An aperture wall isolates the interior fluid cavity from a pass-through conduit for electrical wires that pass through and connect to the electric motor. A plurality of fasteners configured to fit a subset of a plurality of bores in the cooling body. The plurality of bores further defines one or more fluid inlets receiving fluid coolant into a first portion of the interior fluid cavity, one or more fluid outlets dispensing fluid coolant from a second portion of the interior fluid cavity.

In accordance with aspects of the present invention, the cooling plate apparatus can include a central aperture extending through the cooling plate apparatus, through the top wall and through the base wall, aligning with a central axis of an electric motor and/or driveshaft or propeller shaft thereof, surrounded and defined by an exterior surface of the hub wall; and one or more fluid conduit bores isolating fluid coolant flowing into the electric motor from the interior fluid cavity. The cooling plate apparatus can removably connect to the electric motor by attaching a top surface of the cooling plate to a housing or bottom of a stator of the electric motor, making heat conductive contact using a first set of the plurality of fasteners to create a heat conducting junction between the electric motor and the cooling plate apparatus. The first set of fasteners of the plurality of fasteners can each comprise a bolt, extending through both the top wall and the base wall of the cooling body using a bore of a first subset of the plurality of bores and threaded to mate with a motor bore disposed within a housing or bottom of a stator of the electric motor, wherein a first set of bores of the plurality of bores are concentric with and of a same diameter as a plurality of motor bores in the electric motor. The first set of fasteners or a second set of fasteners of the plurality of fasteners can extend through, and attach the cooling plate apparatus to, one or more of a support bracket, an elongate support arm, a support armature or an airframe fuselage. The second set of fasteners can each comprise a bolt, extending through the base wall of the cooling body but not the top wall and can be threaded to mate with a second subset of the plurality of bores comprising blind bores having threads and terminating inside one or more of the hub walls or the cooling body. The plurality of fasteners can each comprise a heat conducting material.

In accordance with aspects of the present invention, the cooling plate can include an aperture wall having an exterior surface that surrounds and defines a pass through aperture dimensioned, and disposed to enable electrical wires to pass through the cooling plate apparatus, wherein the aperture wall isolates the interior fluid cavity from the pass through aperture, with an interior surface of the aperture wall further defining the interior fluid cavity, and wherein the electrical wires comprise power transmission wires or signal transmission wires to connect the electric motor or motor sensors to one or more of an electricity generating source subsystem or a diagnostic subsystem.

In accordance with aspects of the present invention, the interior surface of the hub wall can be contiguous with an interior surface of the partition wall. The interior surface of the hub wall can be contiguous with an interior surface of the aperture wall as well.

In accordance with aspects of the present invention, the top wall of the cooling plate apparatus can be parallel to the base wall. The hub wall and perimeter wall can be annular in cross-section, and the top wall and the base wall can each have a circular perimeter, and the hub wall can be concentric with the perimeter wall. The hub wall and the perimeter wall can each have a wall thickness less than a maximum/outer radius of the cooling plate apparatus while the hub wall is concentric with the perimeter wall. The hub wall, the perimeter wall, the partition wall and an aperture wall can each have an axial height of an axial distance of the offset between the top wall and the base wall and each join a top surface of the base plate at a perpendicular angle, and each join a bottom surface of the top plate at a perpendicular angle. The interior surface of the hub wall is contiguous with an interior surface of the perimeter wall, partition wall, and aperture wall.

In accordance with aspects of the present invention, the cooling plate apparatus can include a fluid inlet to receive fluid coolant into the interior fluid cavity, the interior fluid cavity shaped to transport the fluid coolant around a central axis of the cooling plate apparatus and dispense fluid coolant out of a fluid outlet, wherein the fluid coolant flowing in from the fluid inlet is prevented from mixing with the fluid flowing out of the fluid outlet by the partition wall. Cooling capacity can be modulated by increasing or decreasing the coolant flow. Cooling capacity also can be modulated by selecting a particular fluid coolant or coolant medium (e.g. using water rather than oil or other fluid coolants).

In accordance with aspects of the present invention, the cooling plate can be a heat sink for the electric motor, transferring heat generated by the electric motor by convection, radiation, and/or conduction from the electric motor through the cooling body and then into fluid coolant circulating inside the interior fluid cavity or out into an external environment surrounding the cooling plate apparatus. The heat conducting material of the cooling plate apparatus can include a heat conducting alloy. The heat conducting alloy can be one of titanium, aluminum, or combinations thereof.

In accordance with aspects of the present invention, a first part of the cooling body including the top wall can be machined from a first piece of heat conducting alloy and disposed to fit in a fluid-tight configuration with a second part of the cooling body comprising the base wall that can be machined from a second piece of heat conducting alloy, wherein first part is then fastened to the second part of the cooling body. The base wall of the cooling body and/or the top wall of the cooling body further can comprise one or more coupling structures to mate the base wall to the top wall. The first part can be fastened to the second part of the cooling body using a third set of the plurality of fasteners, each comprising a bolt, extending through the base wall of the cooling body but not the top wall and threaded to mate with a third subset of the plurality of bores comprising blind bores having threads and terminating inside one or more of the perimeter wall, the hub wall or the cooling body. The cooling body can include the first part and the second part both constructed of the heat conducting alloy comprising aluminum with the first part coupled to the second part, the second part comprising a recessed cavity creating the fluid cavity, wherein a gasket creating a fluid seal is interposed between the first part and the second part when the first part is coupled to the second part. In an alternative example embodiment, the cooling plate apparatus can be formed as a single part from the heat conducting alloy using a three-dimensional (3D) printing tool or technique. The entire cooling body can be 3D printed as a solid body from aluminum, titanium or other 3D-printing materials known in the art, having a singular solid outer form and a hollow interior, while otherwise comprising the key elements, components and features described herein.

In accordance with aspects of the present invention, the first subset of the plurality of bores can be disposed within or through the hub wall at equal radial distances from a central axis of the cooling plate apparatus with a uniform spacing comprising equal distances between a center axis of each bore of the first subset to a center axis of an adjacent bore of the first subset of the plurality of bores. A fourth subset of the plurality of bores of the cooling plate can include conduit bores configured to connect fluid conduits or electrical wires and connections thereof to the electric motor, depending on the interface design of the particular electric motor.

In accordance with aspects of the present invention, the interior fluid cavity can contain and circulate a fluid coolant that can be a liquid coolant or a phase-change fluid. The interior fluid cavity can contain and circulate a liquid coolant including water, or an antifreeze (e.g. combination, mixture or solution of water and ethylene glycol), or oil. The cooling plate apparatus can be in fluid communication with one or more of coolant pumps, coolant reservoirs, coolant junctions, coolant outlets or coolant inlets by using one or more high-pressure lines or fluid conduits that are removably connected to and in fluid communication with the cooling plate via fluid inlet fittings or fluid outlet fittings. The cooling plate apparatus can be in fluid communication with a cooling system or fluid circulation system of the electric motor, wherein heated fluid coolant from the electric motor is circulated through the cooling plate apparatus using the interior fluid cavity to cool the heated fluid coolant by thermal energy transfer using convection, radiation, and/or conduction, wherein cooled fluid coolant is thereafter recirculated into the cooling system or fluid circulation system of the electric motor. The cooling plate apparatus can include one or more fluid inlets that receive fluid coolant from one or more high-pressure lines or fluid conduits through a fluid inlet fitting joining the one or more high-pressure lines or fluid conduits to a fifth subset of the plurality of bores, thereby forming a fluid tight conduit through the base wall into a first portion of the interior fluid cavity. The cooling plate apparatus can include one or more fluid outlets that dispense fluid coolant to one or more high-pressure lines or fluid conduits through a fluid outlet fitting joining the one or more high-pressure lines or fluid conduits to a sixth subset of the plurality of bores, thereby forming a fluid tight conduit through the base wall into a second portion of the interior fluid cavity. The cooling plate apparatus can generate a flow of fluid coolant through interconnected components in fluid communication comprising: a coolant source, including one or more of coolant pumps, coolant reservoirs, coolant junctions, or coolant outlets; an inlet line comprising a high-pressure line or fluid conduit disposed through a fluid conduit bore of a fourth subset of the plurality of bores that is removably connected to, and in fluid communication with, at a first end, a coolant source, including one or more of coolant pumps, coolant reservoirs, coolant junctions, or coolant outlets, and at a second end, an inlet of a cooling system or fluid circulation system of the electric motor using a throughlet fitting; the cooling system or fluid circulation system of the electric motor; the cooling system or fluid circulation system of the electric motor into the cooling plate apparatus, a first intermediate line comprising a high-pressure line or fluid conduit disposed through a fluid conduit bore of a fourth subset of the plurality of bores that is removably connected to, and in fluid communication with, at a first end, an outlet of the cooling system or fluid circulation system of the electric motor using a throughlet fitting, and at a second end, an inlet fitting of the one or more fluid inlets of the cooling body; the interior fluid cavity of the cooling body of the cooling plate apparatus via one or more fluid inlets configured to receive fluid coolant; a central axis of the cooling plate apparatus, circulating within the interior fluid cavity in a direction from the fluid inlet to the fluid outlet, maintaining fluid contact with one or more of an interior surface of the hub wall, an interior surface of the top wall, an interior surface of the base wall, an interior surface of the perimeter wall, an interior surface of the partition wall, an interior surface of an aperture wall, or combinations thereof; the interior fluid cavity of the cooling body of the cooling plate apparatus via a fluid outlet removably connected to, and in fluid communication with, a first end of an outlet line comprising a high-pressure line or fluid conduit via a fluid outlet fitting, wherein a second end of the outlet line is removably connected to, and in fluid communication with, the coolant source; and thereby directing a flow of coolant from a coolant source, through the inlet line, through the cooling system or fluid circulation system of the electric motor; from the cooling system or fluid circulation system of the electric motor into the cooling plate apparatus, through the first intermediate line, into the interior fluid cavity of the cooling body of the cooling plate apparatus via the one or more fluid inlets, around the central axis of the cooling plate apparatus, in a direction from the fluid inlet to the fluid outlet, out of the interior fluid cavity via the fluid outlet through an outlet line via a fluid outlet fitting, back to the coolant source, cooling the electric motor and parts thereof by conduction, convection, radiation, and thereby transporting unheated fluid coolant to, and heated coolant from, the electric motor in an iterative cycle.

In accordance with aspects of the present invention, the cooling plate apparatus can include a plurality of fluid inlets, a plurality of inlet lines, a plurality of intermediate lines, a plurality of fluid outlets, and a plurality of outlet lines, the plurality of fluid inlets and the plurality of fluid outlets each disposed within the cooling body enabling fluid to pass into and out of the interior fluid cavity. The cooling plate apparatus can be further configured to generate a flow of fluid coolant through each of the plurality of inlets and the plurality of outlets.

In accordance with aspects of the present invention, the cooling plate apparatus can be indirectly coupled to, and not directly in fluid communication with, a cooling system of the electric motor. The cooling body can be interconnected with heat conducting components of the electric motor, thereby transferring heat from the electric motor to the cooling body by surface contact and conduction using the top wall, the bores and the fasteners. The cooled fluid coolant can be then recirculated and the cooling plate apparatus can generate a flow of fluid coolant through interconnected components in fluid communication comprising: a coolant source, comprising one or more of coolant pumps, coolant reservoirs, coolant junctions, or coolant outlets; an inlet line comprising a high-pressure line or fluid conduit that is removably connected to, and in fluid communication with, at a first end, a coolant source, comprising one or more of coolant pumps, coolant reservoirs, coolant junctions, or coolant outlets, and at a second end, an inlet fitting of the one or more fluid inlets of the cooling body configured to receive fluid coolant into the interior fluid cavity of the cooling body; a central axis of the cooling plate apparatus, circulating within the interior fluid cavity in a direction from the fluid inlet to the fluid outlet, maintaining fluid contact with one or more of an interior surface of the hub wall, an interior surface of the top wall, an interior surface of the base wall, an interior surface of the perimeter wall, an interior surface of the partition wall, an interior surface of an aperture wall, or combinations thereof; the interior fluid cavity of the cooling body of the cooling plate apparatus via a fluid outlet removably connected to, and in fluid communication with, a first end of an outlet line comprising a high-pressure line or fluid conduit via a fluid outlet fitting, wherein a second end of the outlet line is removably connected to, and in fluid communication with, the coolant source. The cooling plate apparatus can thereby direct a flow of coolant from a coolant source, through the inlet line, into the cooling plate apparatus, into the interior fluid cavity of the cooling body of the cooling plate apparatus via the one or more fluid inlets, around the central axis of the cooling plate apparatus, in a direction from the fluid inlet to the fluid outlet, out of the interior fluid cavity via the fluid outlet through an outlet line via a fluid outlet fitting, back to the coolant source, cooling the electric motor and parts thereof by conduction, convection, radiation, and thereby transporting heat from the electric motor in an iterative cycle.

In accordance with aspects of the present invention, the cooling plate apparatus can further comprise a seventh subset of bores disposed into or through the perimeter wall, defining one or more of fluid inlets, fluid outlets, fluid conduit bores, or sensor ports. The electrical wires that pass through and connect to the electric motor can comprise one or more of power supply wires, three phase power connectors, temperature sensors, hall sensors, speed and position sensors, resolvers, tandem resolvers, encoders, sensors for synchronizing electrical and mechanical motor angle, or sensors for controlling position, direction and rotation speed of the electric motor. Additional wires of the electrical wires can pass through a central aperture extending through the cooling plate apparatus or the pass-through conduit for electrical wires.

BRIEF DESCRIPTION OF THE DRAWINGS

These and other characteristics of the present invention will be more fully understood by reference to the following detailed description in conjunction with the attached drawings, in which.

DETAILED DESCRIPTION

Figure 1:
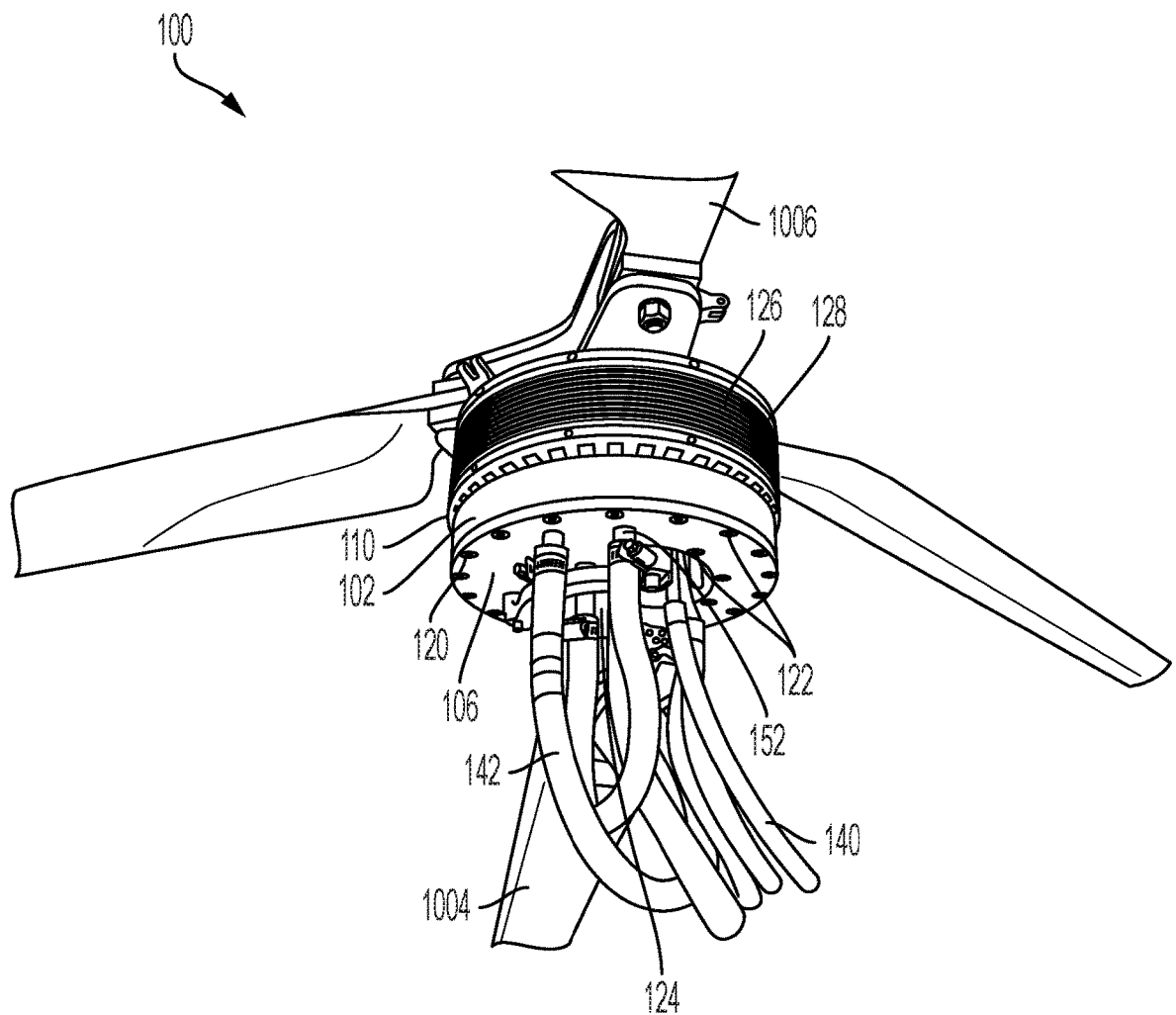
FIG. 1 depicts a cooling plate apparatus and related components.

To provide an overall understanding, certain illustrative embodiments will now be described; however, it will be understood by one of skill in the art that the systems and methods described herein can be adapted and modified to provide systems and methods for other suitable applications and that other additions and modifications can be made without departing from the scope of the systems and methods described herein. In particular, the systems and methods described herein can be adapted to apply to inrunner as well as outrunner style electric motors, provided an effective thermal path can be accomplished into the interior heat-generating area of the electric motor, whether in the rotor or the stator depending on the mechanics of the design of a particular electric motor.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods.

An illustrative embodiment of the present invention relates to an improved efficiency cooling plate apparatus for cooling motors or other heat generating components, having a cooling body including a plurality of bores, apertures and interior chambers working together to process and circulate fluid coolant and function as a heat sink device. The invention is capable of interconnecting with the cooling system of an electric motor and cooperatively functioning to transfer thermal energy away from the electric motor using principles of thermodynamics including conduction, convection and radiation, while transporting heated fluid coolant away from heated motor components and to other components of a vehicle for further processing, then returning cooled fluid coolant into the cooling system of an electric motor. The design of the cooling plate apparatus components effectively partitions heated fluid coolant, cooled fluid coolant, and electrical circuitry in isolated dedicated sections of the apparatus that prevent infiltration of other fluids while increasing surface contact with components used to establish a favorable rate and vector of heat transfer in a space saving design formed from a single part or minimal number of parts to reduce modes of failure and reduce required fasteners or connections to improve robustness and reliability while maintaining suitable aerodynamic characteristics. The cooling plate apparatus may be formed as a single part from a heat conducting alloy using a three-dimensional printing tools or techniques, including by additive manufacture based on a from a computer-aided design (CAD) with electron beam or selective laser melting, direct metal laser sintering (DMLS), powder bed fusion, gas metal arc welding 3D printing, or other processes known in the art.

The cooling plate apparatus, method and system can be integrated into a full-scale clean fuel electric-powered multirotor aircraft as in the vehicles described in U.S. Pat. Nos. 9,764,822 and 9,242,728, incorporated by reference herein. The one or more fuel cell modules of the integrated system comprise a plurality of fuel cells individually functioning in parallel or series but working together to process gaseous oxygen and gaseous hydrogen extracted from liquid hydrogen by heat exchangers, using an electrical circuit configured to collect electrons from the plurality of hydrogen fuel cells to supply voltage and current to motor controllers commanded by autopilot control units configured to select and control an amount and distribution of electrical voltage and torque or current for each of the plurality of motor and propeller assemblies. Lift and propulsion are provided by pairs of small AC or DC brushless electric motors each driving directly-connected pairs of counter-rotating propellers, also referred to as rotors. The use of counter-rotating propellers on each pair of motors cancels out the torque that would otherwise be generated by the rotational inertia. Fuel cell modules, motors, motor controllers, batteries, circuit boards, and other electronics must have excess or waste heat removed or dissipated. The integrated system comprises at least a power generation subsystem comprising one or more radiators in fluid communication with the one or more fuel cell modules, configured to store and transport a coolant, and a thermal energy control subsystem comprising a heat exchanger configured with a plurality of fluid conduits. The integrated system can also include a fuel supply subsystem comprising a fuel tank in fluid communication with one or more fuel cell modules and configured to store and transport a fuel such as liquid hydrogen, gaseous hydrogen, or a similar fluid. When power is provided by one or more fuel cell modules for generating electrical voltage and current, electronics monitor and control electrical generation and excess heat or thermal energy production, and motor controllers then control the commanded voltage and current to each motor and to measure its performance, using control system including automatic computer monitoring by programmed single or redundant digital autopilot control units (autopilot computers), or motor management computers, controls each motor-controller and motor to produce pitch, bank, yaw and elevation, while also simultaneously controlling cooling and heating parameters and thermodynamic operating conditions, valves and pumps while measuring, calculating, and adjusting temperature and heat transfer of aircraft components, to protect motors, fuel cells, and other critical components from exceeding operating parameters. One or more temperature sensing devices or thermal energy sensing devices are configured to measure thermodynamic operating conditions with the autopilot control unit comprising a computer processor configured to compute a temperature adjustment protocol comprising one or more priorities for energy transfer using one or more thermal references and select and control, based on the temperature adjustment protocol, an amount and distribution of thermal energy transfer from one or more sources to one or more thermal energy destinations.

FIGS. 1-25, wherein like parts are designated by like reference numerals throughout, illustrate an example embodiment or embodiments of a lightweight, high efficiency, fault-tolerant cooling plate apparatus, method and system, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 2:
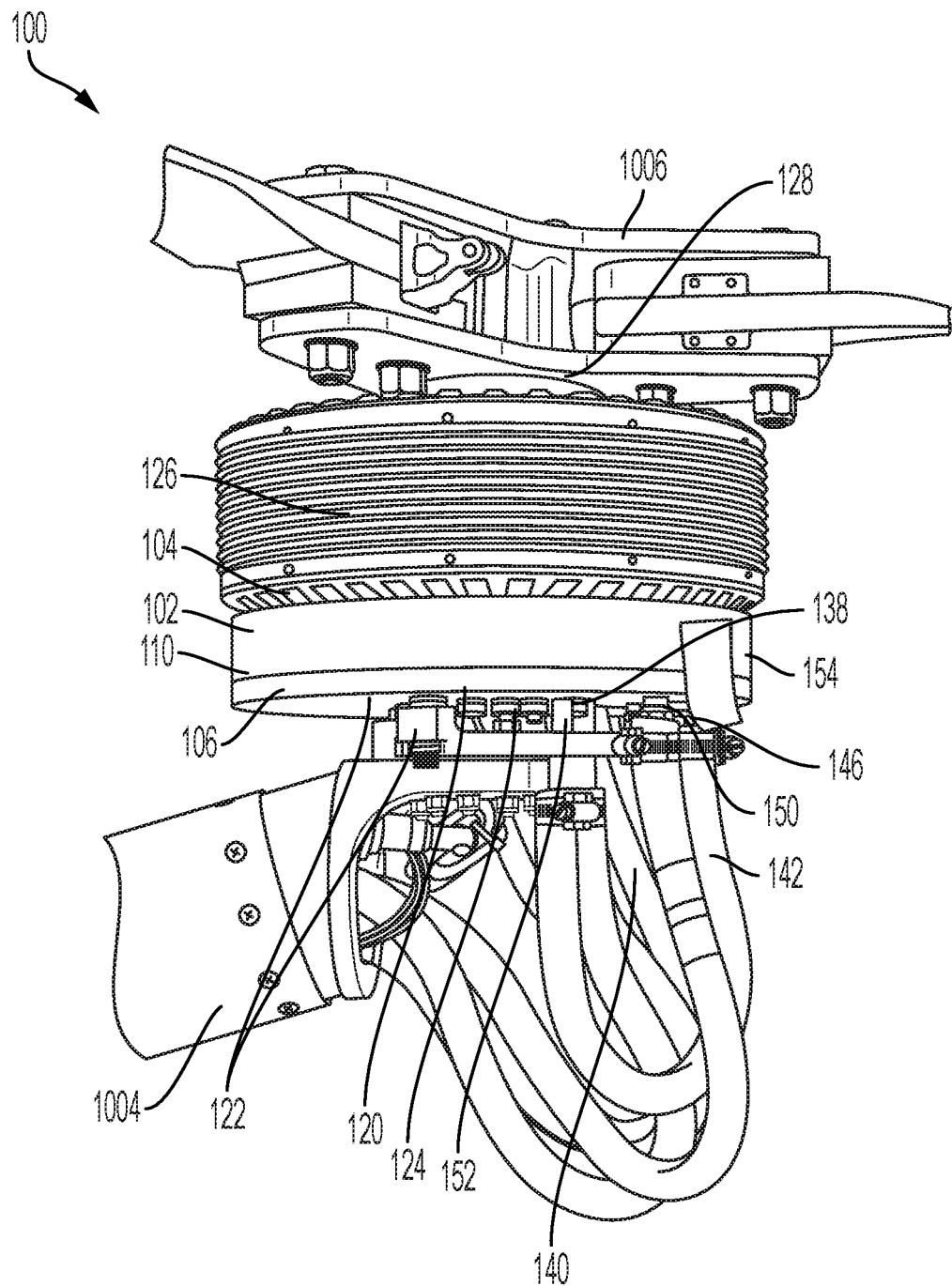
FIG. 2 depicts a cooling plate apparatus and systems connectivity for various related components of the invention.

FIG. 1 and FIG. 2 depict an example embodiment of a cooling plate apparatus 100 and systems connectivity for various related components of the invention. The cooling plate apparatus 100 incorporates a cooling body 102 of an aerodynamic configuration and structure that is constructed from suitably strong heat conducting material such that the cooling plate apparatus 100 can function as a heat sink and structural support for one or more electric motors 126 without comprising the positioning or aerodynamics of the mounted electric motor 126. The cooling body 102 is constructed to be capable of being disposed in a position intervening between one or more mounting brackets and one or more electric motors 126, requiring only replacement standard motor fasteners with longer, heat conducting fasteners 122 of the same diameter and configuration (including e.g. thread type, lead, angle, pitch, starts, depth, major diameter, minor diameter or taper for threaded fasteners), allowing the same aligning method to be continued to mate the motor 126, cooling plate apparatus 100 and support bracket as was used for the motor and support bracket alone. The cooling plate apparatus 100 is shaped to meet a number of different motor types and diameters, having a plurality of bores 120 that align with one or more motor bores 134 present in the motor 126 from standard original manufacture. The cooling body 102 can be connected to the body of the motor 126 by securing fasteners 122 through a mounting bracket connected to e.g. an elongate support arm 1004 (belonging to e.g. a vehicle such as an aircraft 1000), then into or through one or more of the plurality of bores 120, and optionally then into or through the one or more motors 126 by threading into or otherwise connecting to one or more motor bores 134. The motor 126 may then be connected to or coupled with one or more propellers or rotors 1006 such that attachment of the cooling body 102 (e.g. to the stator 130, frame or body of the motor 126) does not interfere with the function of the motor 126 to rotate the rotor 132, motor shaft 128 and one or more propellers or rotors 1006. In an example embodiment, the cooling body 102 comprises a top wall 104, base wall 106 and perimeter wall 110, the interior surfaces of each defining an interior fluid cavity 116 constructed to circulate fluid coolant 118 that may be used to perform heat transfer to dissipate or remove excess or waste heat or thermal energy generated by a motor 126, either indirectly on a motor 126 through surfaces and components including the cooling body 102, or by directly coupling with the motor 126 to come into fluid communication with the internal cooling system of the motor 126 itself. If indirectly coupled to a cooling system of the motor 126, the cooling plate apparatus 100 interconnects the cooling body 102 and heat conducting components of the motor 126 including the base, stator 130, frame, or body of the motor 126, thereby transferring heat from the motor 126 to the cooling body 102 by surface contact and contact between bores (120, 134) and fasteners 122. If directly coupled to a cooling system of the electric motor 126, the cooling plate apparatus 100 interconnects with the flow of fluid coolant 118 into and out of the motor 126, in seamless fluid communication with the motor 126 and the cooling source 1010 or heat transfer or management system 1010 used with that motor 126 (e.g. a radiator, heat sink, or heat exchanger). The cooling body 102 and motor 126 may be interconnected in fluid communication using a number of fluid conduits 142 or high pressure lines that deliver or remove fluid coolant 118, that can be attached to the cooling body 102 using one or more fluid inlet fittings 146, one or more fluid outlet fittings 150, or one or more throughlet fittings 152 that fit fluid conduits 142 or high pressure lines, securely connecting thereto by any number of methods known in the art (e.g. by clamps, locks, friction, adhesive, etc.). Throughlet fittings 152 are designed, constructed, and disposed to bypass fluid coolant 118 into the motor 126 without exposing that fluid to the interior of the cooling body 102, while still preserving contact with the cooling body 102 for thermodynamic transfer purposes. In an example embodiment, the cooling plate apparatus 100 comprises a central aperture 124 extending through the cooling plate apparatus 100 that aligns with the central aperture 124 of the electric motor 126 where the motor shaft 128 or electrical wires 140 may be passed through or accessed. Importantly, the cooling body 102 can be specifically constructed to secure or guide electrical wires 140 through the perimeter of the cooling body 102 without allowing those wires 140 to come in contact with the interior of the cooling body 102 or fluid coolant 118, using the central aperture 124, one of the plurality of bores 120, or a pass-through conduit defined by an aperture wall 114 of the cooling body 102 isolating the interior fluid cavity 116 from electrical wires 140 that pass through and connect to the electric motor 126. The walls and components of the cooling plate apparatus 100 can be securely attached or mated using a plurality of fasteners 122 configured to fit a subset of a plurality of bores 120 in the cooling body 102. Interconnection of components as described herein provides cooling of an electric motor 126 regardless of whether or not that electric motor 126 has any internal fluid cooling ports to provide fluid communication, or is cooled by other means. In an alternative example embodiment, the cooling plate apparatus can be formed as the first part and the second part both from the heat conducting alloy using a three-dimensional (3D) printing tool, wherein the base wall of the cooling body and/or the top wall of the cooling body further comprise one or more coupling structures to mate the base wall to the top wall. The one or more coupling structures can be formed during the three-dimensional (3D) printing of the first part and the second part or attached thereafter, and the one or more coupling structures can comprise one or more common coupling devices and components including posts, slots, ribs, pegs, hooks, fins, lips, contours, finger projections, tabs, press fits, snap fits, threads, protrusions, shaped recesses, combinations thereof, or similar coupling structures known in the art. In alternative embodiments, the cooling body may be further subdivided into various numbers of components that mate, couple, interconnect or interlock in order to facilitate machining or be 3D printing, as understood by one of skill in the art. The critical aspect is forming a rigid structure with the components described to support the various loads while creating an internal fluid cavity that can be made fluid tight and capable of heat transfer.

Figure 3:
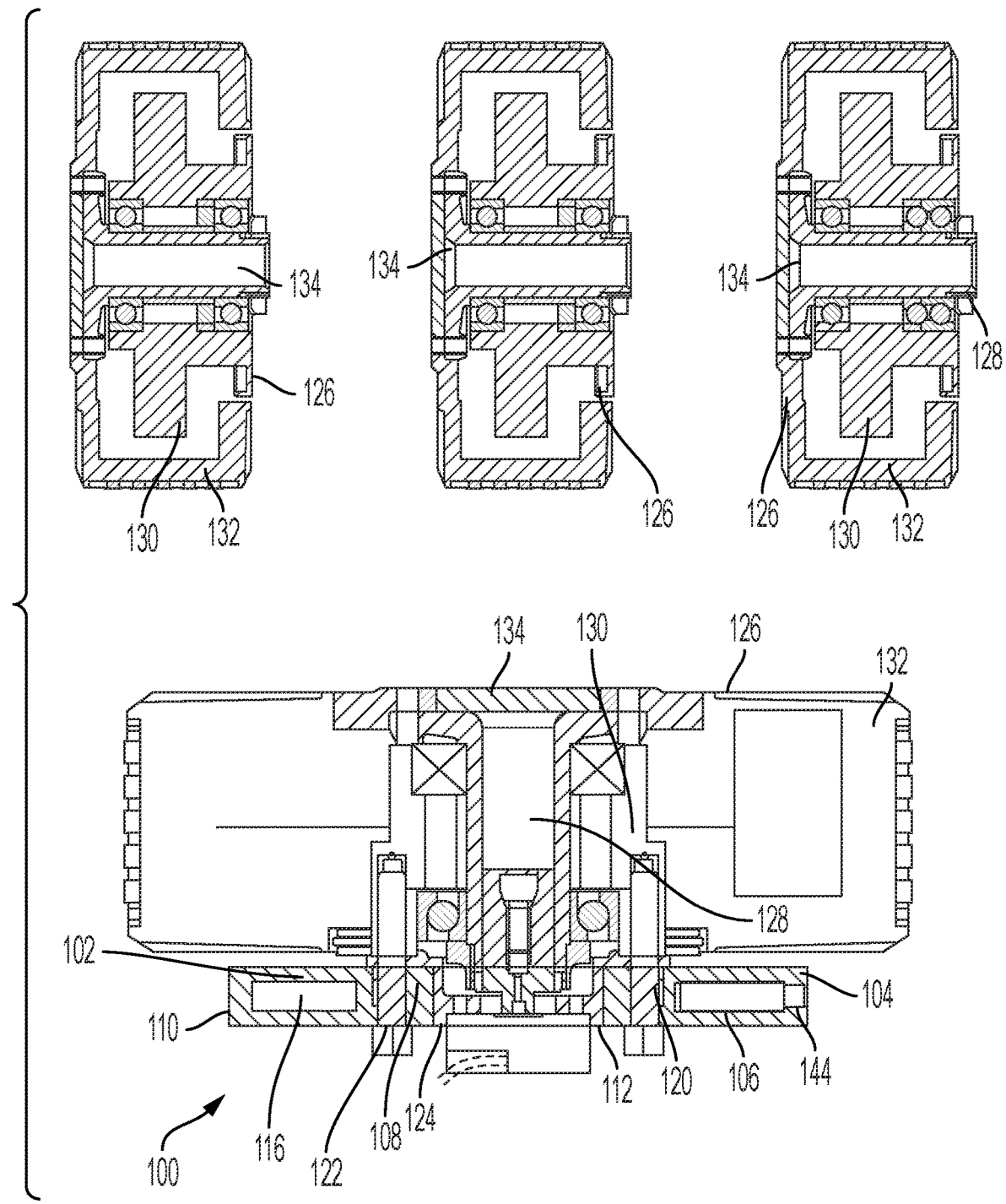
FIG. 3 depicts side views of the electric motor and cooling plate apparatus.

FIG. 3 depicts a cutaway side view of an example embodiment of the electric motor 126 coupled or mated to the top wall 104 of the cooling plate apparatus 100. The fasteners 122 secure the cooling body 102 to the motor 126 by threading through a subset of the plurality of bores 120 and into a subset of motor bores 134 contiguous with the stator 130, enabling the rotor 132 to rotate about the shaft 128 that aligns with the central aperture 124. Around the central aperture 124 of the cooling body 102, hub wall 108, interposed between the top wall 104 and the base wall 106, separates portions of the interior fluid cavity 116 from the exterior of the cooling body 102 and comprises the subset of bores 120 through which the fasteners 122 secure the cooling body 102 to the motor 126, such that the fasteners 122 pass through the hub wall 108 thickness and remain isolated from fluid contact with the interior fluid cavity 116 but can transfer or transmit heat or thermal energy from the interior through the surfaces of the hub wall 108. In an example embodiment, the interior of the cooling body 102 contains at least one partition wall 112 interposed between the top wall 104 and the base wall 106, configured to separate portions of the interior fluid cavity 116 and enable a directional flow through the interior fluid cavity 116, around the interior surface of the hub wall 108 and aperture wall 114 and within the interior surface of the perimeter wall 110 from one or more fluid inlets 144, to one or more fluid outlets 148 allowing fluid to pass from the interior to the exterior of the cooling body 102. Additionally, one or more perimeter wall bores 154 may provide one or more fluid inlets 144, to one or more fluid outlets 148 with respect to the interior fluid cavity 116 or one or more conduit bores 138 or blind bores 136 used to secure components of the cooling plate apparatus 100 to each other, most often by use of fasteners 122. Alternative embodiments may place fluid inlets 144, fluid outlets 148 or bores 120 on other of the top wall 104, base wall 106, hub wall 108 or aperture wall 114, etc., as would be understood by one of skill in the art.

Figure 4:
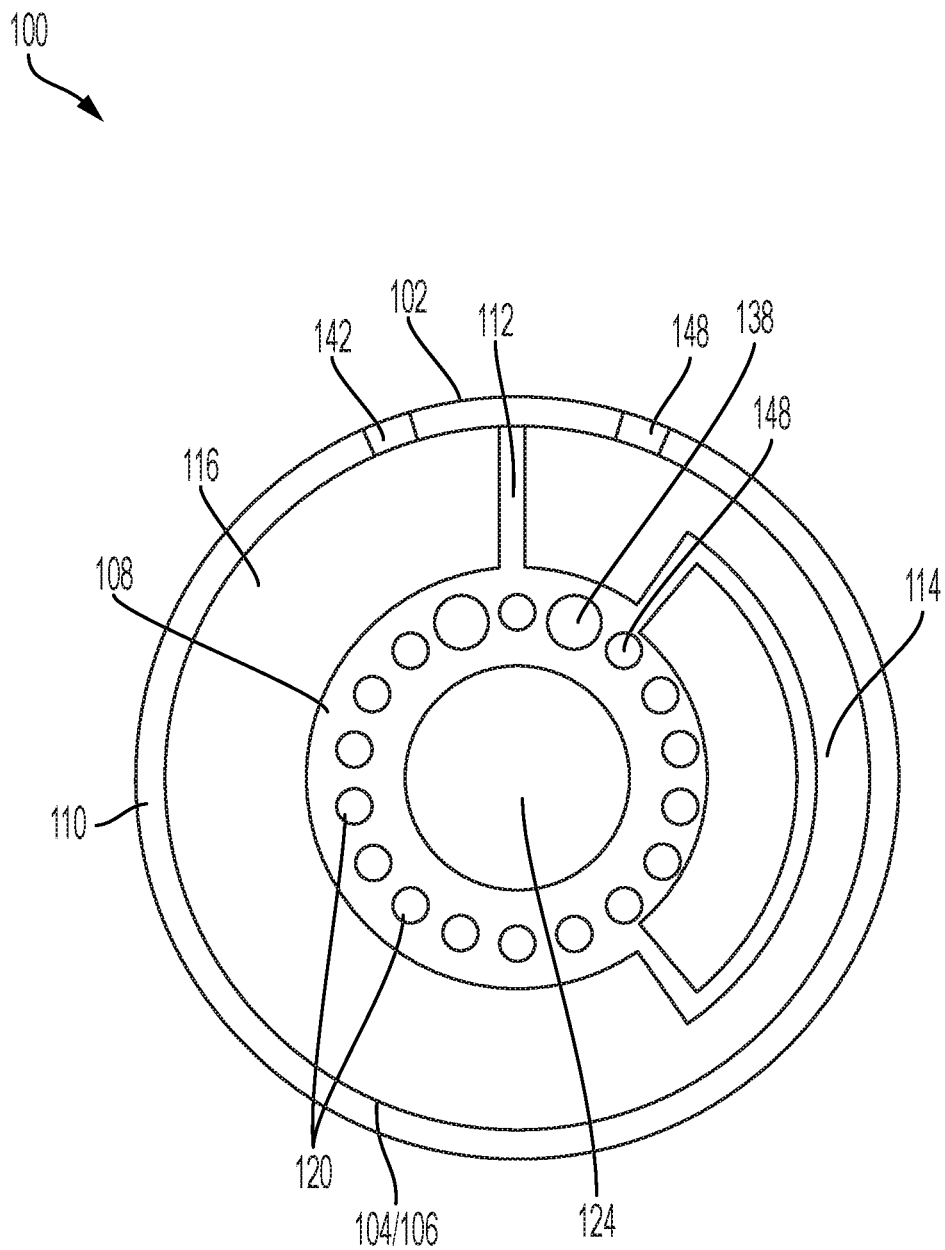
FIG. 4 depicts a top view of the cooling plate apparatus.
Figure 5:
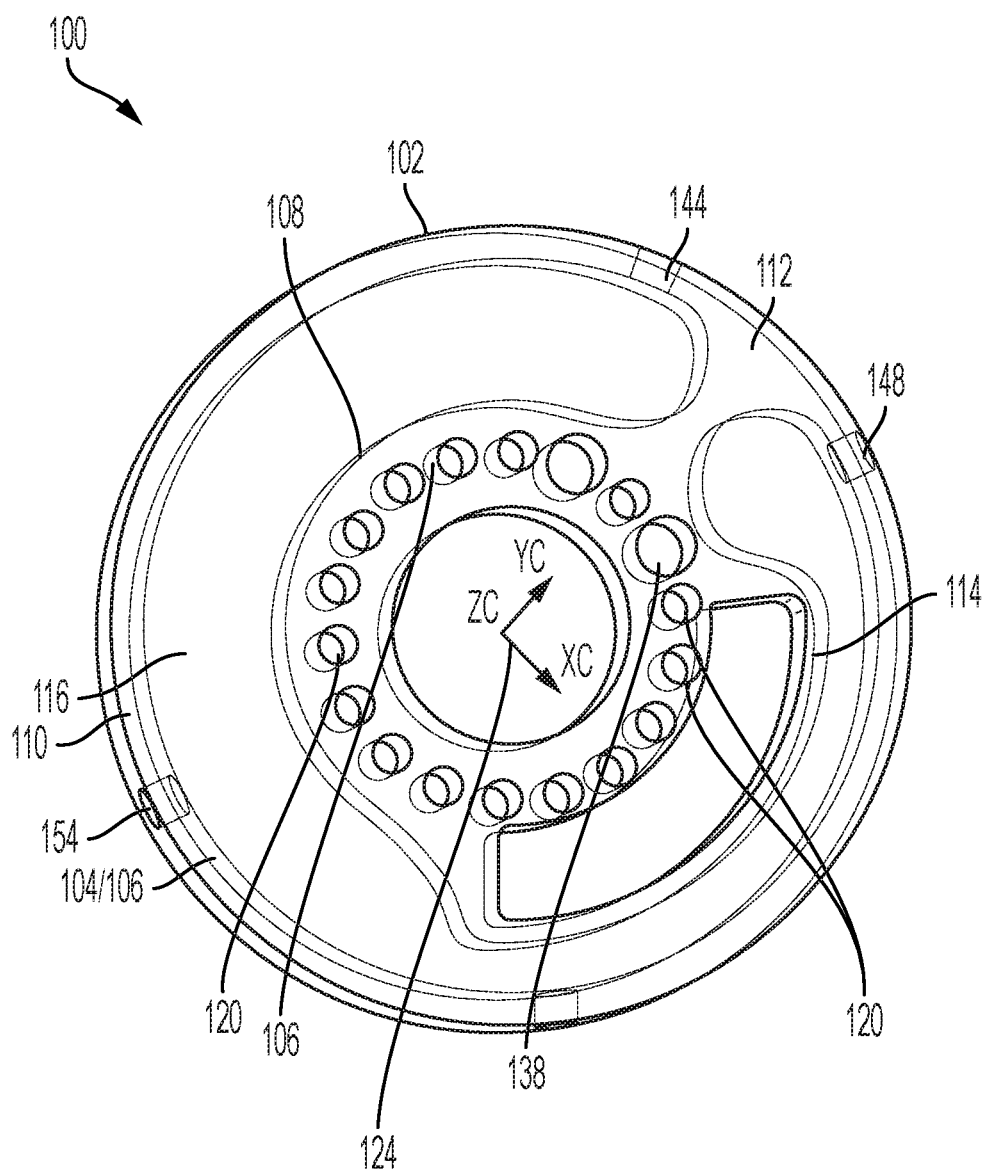
FIG. 5 depicts a top view of the cooling plate apparatus.

FIG. 4 and FIG. 5 depict example top views of the cooling plate apparatus 100, demonstrating an example embodiment where a fluid inlet 144 and fluid outlet 148 are disposed on opposite sides of the partition wall 112 to promote flow through the interior fluid cavity 116 with a subset of the plurality of bores 120 further defining one or more fluid inlets 144 receiving fluid coolant 118 into a first portion of the interior fluid cavity 116, one or more fluid outlets 148 dispensing fluid coolant from a second portion of the interior fluid cavity 116, and one or more fluid conduit bores 138 isolating fluid coolant flowing into the electric motor 126 through one or more fluid conduits 142 from the interior fluid cavity 116. In this example embodiment a subset of the plurality of bores 120, including the two conduit bores 138, are extended through the hub wall 108 of the cooling body 102 in a circular or annular configuration offset from the exterior surface of the hub wall 108 that defines the central aperture 124, such that the centers of each of the subset of bores 120 are equidistant from a central axis of the central aperture 124 and/or the exterior surface of the hub wall 108, and are equidistant from each other. Placement of bores 120 may be altered to accommodate motor bores 138, shafts 128, fasteners 122, conduits, electrical wires 140, partition walls 112, aperture walls 114, pass-through conduits etc., as would be understood by one of skill in the art.

Figure 6:
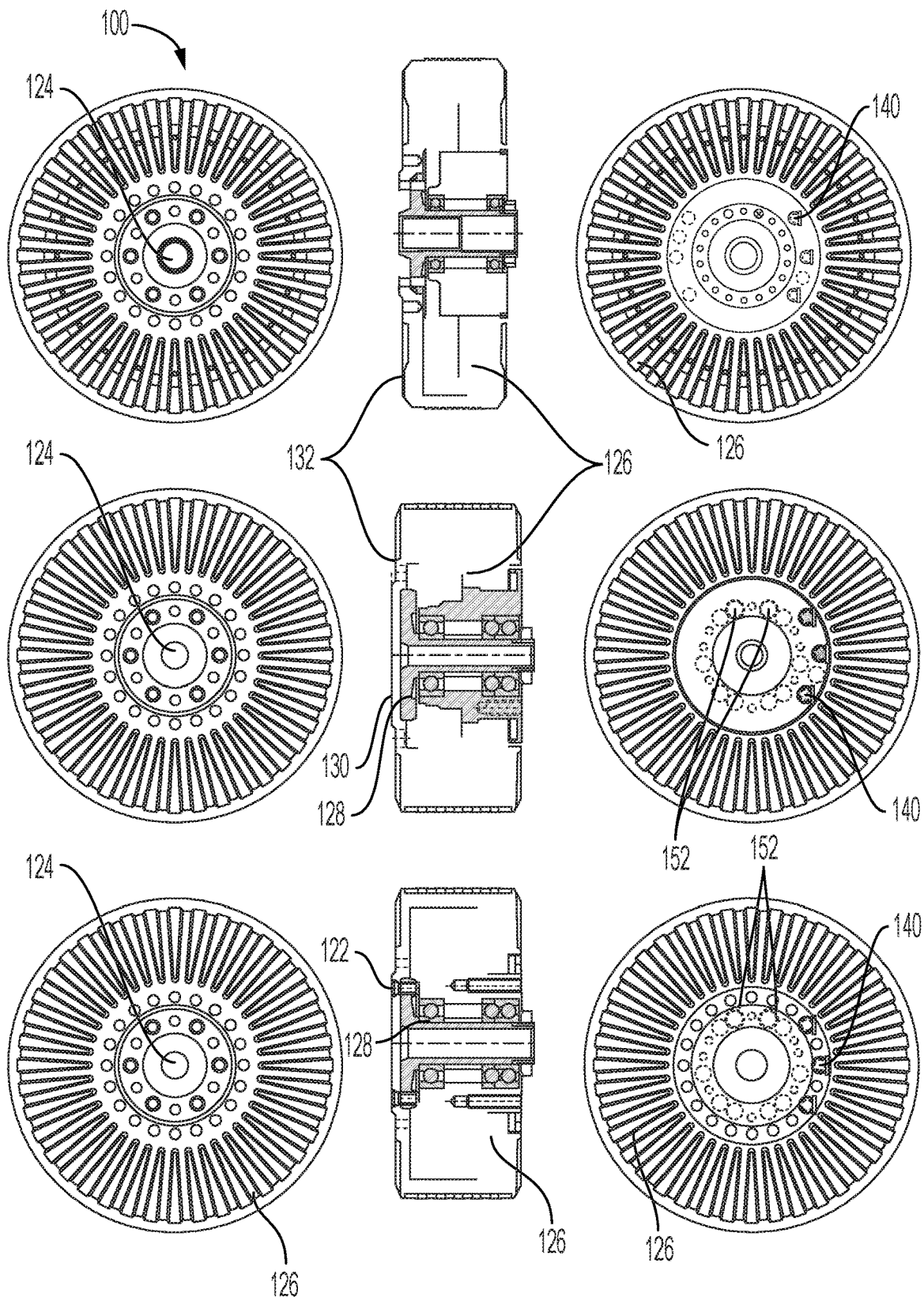
FIG. 6 depicts front, cutaway and rear views of the electric motor and cooling plate components.
Figure 7:
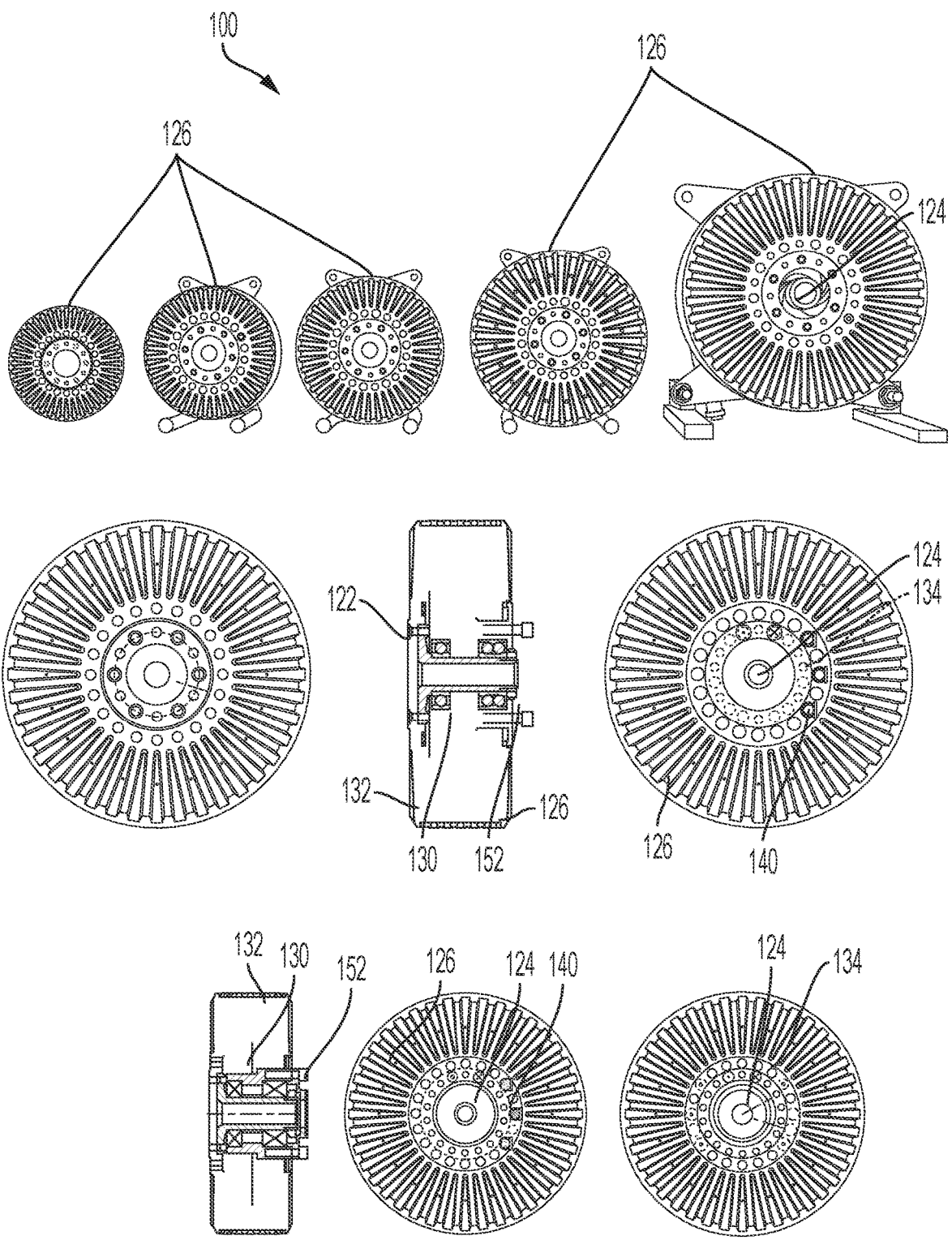
FIG. 7 depicts front, cutaway and rear views of the electric motor and cooling plate components.

FIG. 6 and FIG. 7 depict example illustrative diagrams presenting front, cutaway and rear views of the electric motor and cooling plate components. In an example embodiment, the cooling body 102 of the cooling plate apparatus 100 is constructed, configured, and disposed so that the central aperture 124 aligns with the motor shaft 128 of each type of motor 126. The conduit bores 138 located in the hub wall 108 align with corresponding motor bores 134 including the inlet and outlet for the internal cooling system of the motor allowing for insertion and attachment of optional throughlet fittings 152 through the cooling body 102 and into the motor 126. The pass-through conduit defined by the aperture wall 114 aligns with the electrical terminals, connectors, junctions, or electrical wires 140 extending from the motor 126, such that the aperture wall 114 surrounds and protects the electrical wires 140 passing through the pass-through conduit while isolating those wires 140 from the interior of the cooling body 102 and allowing access to the connections, terminals, or junctions and electrical wires 140, for purposes including attachment, removal, inspection, maintenance, and replacement. Motors of the multiple motors 126 and propellers 1006 in the preferred embodiment are brushless synchronous three-phase AC or DC motors, capable of operating as an aircraft motor, and that are air-cooled or liquid cooled or both. Motors and fuel cell modules 18 generate excess or waste heat from forces including electrical resistance and friction, and so this heat may be subject to management and thermal energy transfer. In one embodiment, the motors are connected to a separate cooling loop or circuit from the fuel cell modules 18. In another embodiment, the motors are connected to a shared cooling loop or circuit with the fuel cell modules 18.

Figure 8:
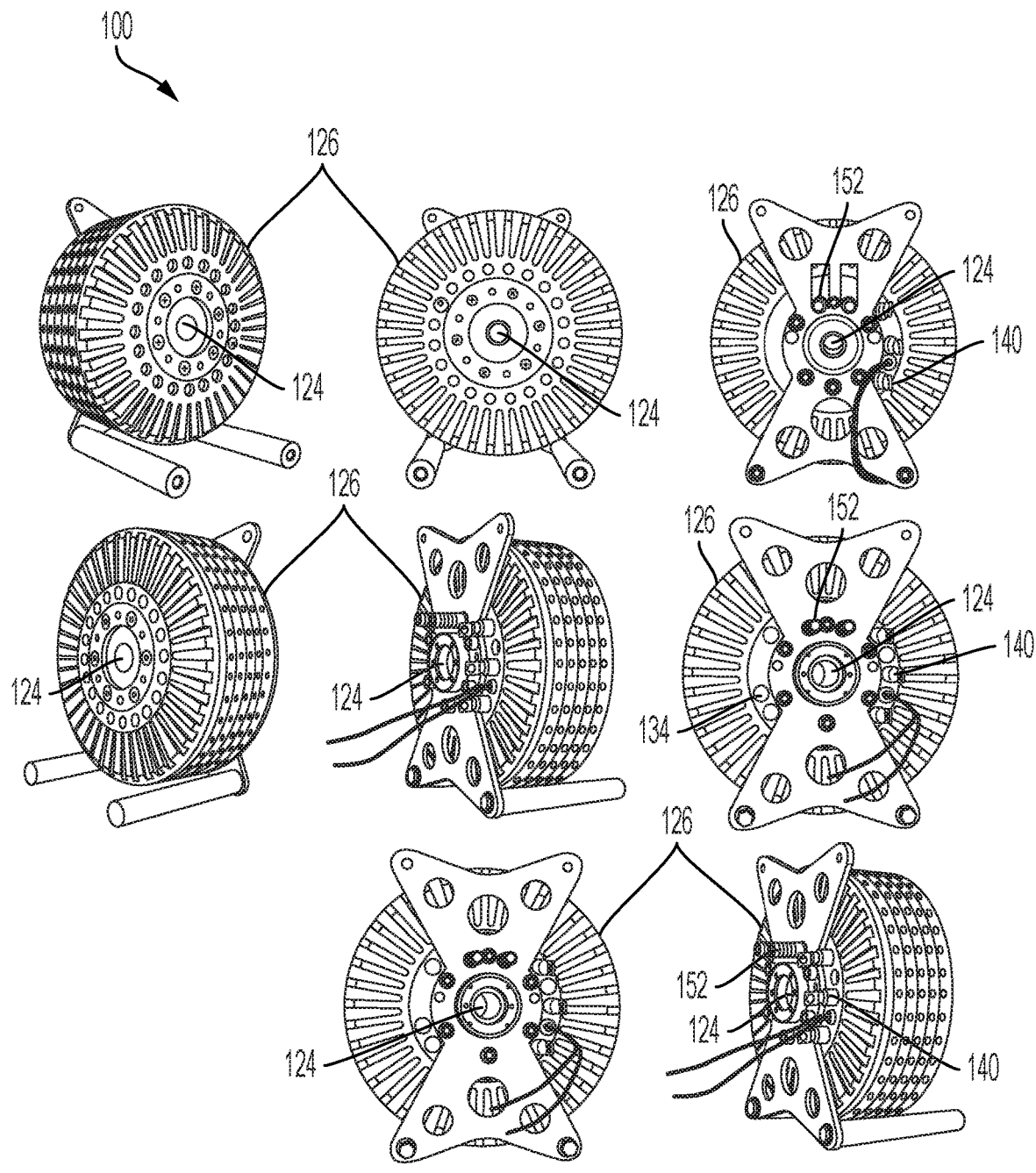
FIG. 8 depicts multiple electric motor sizes and front, cutaway and rear views of the electric motor and cooling plate components.
Figure 9:
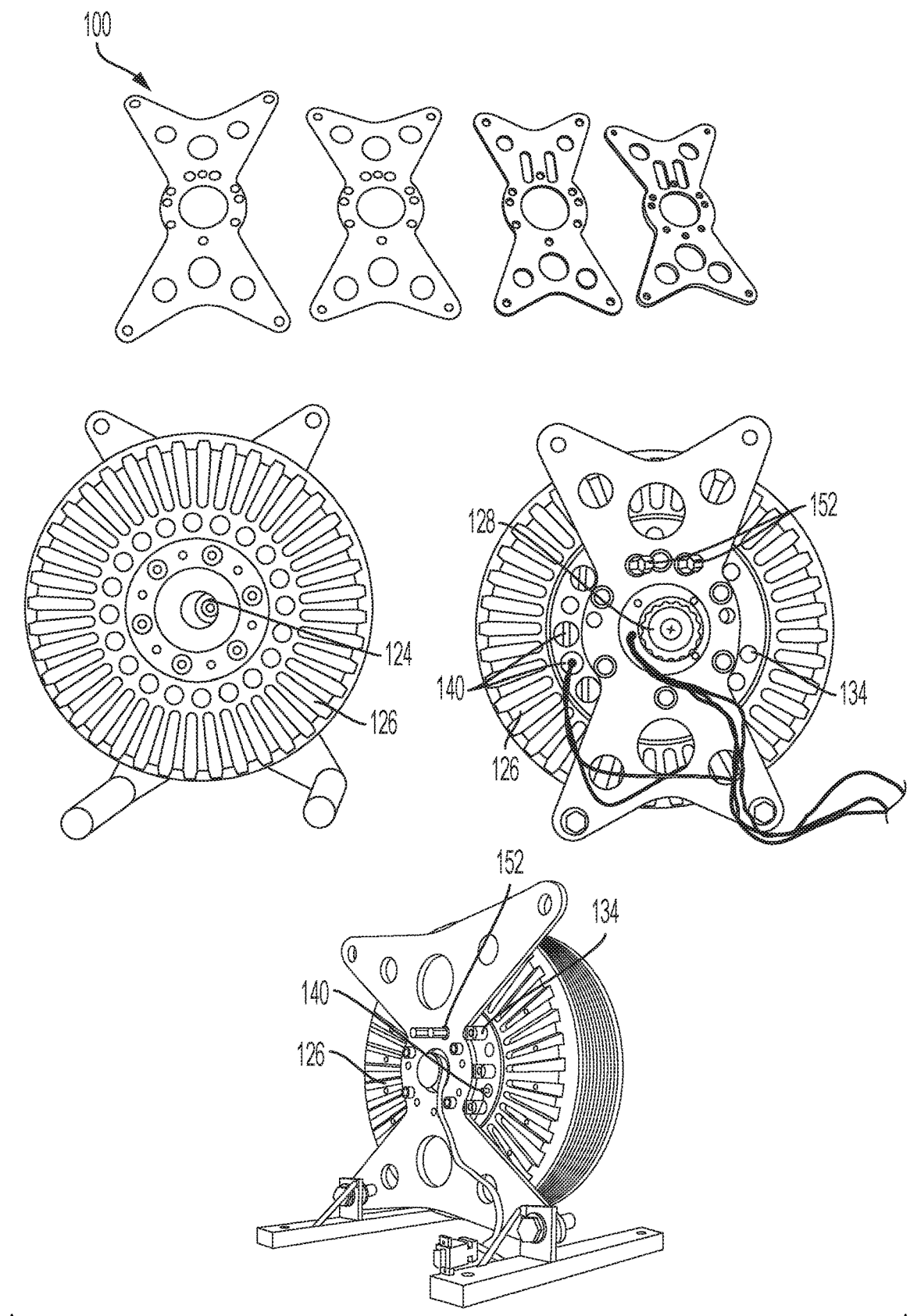
FIG. 9 depicts various views of the electric motor and cooling plate fittings and electrical connections.
Figure 10:
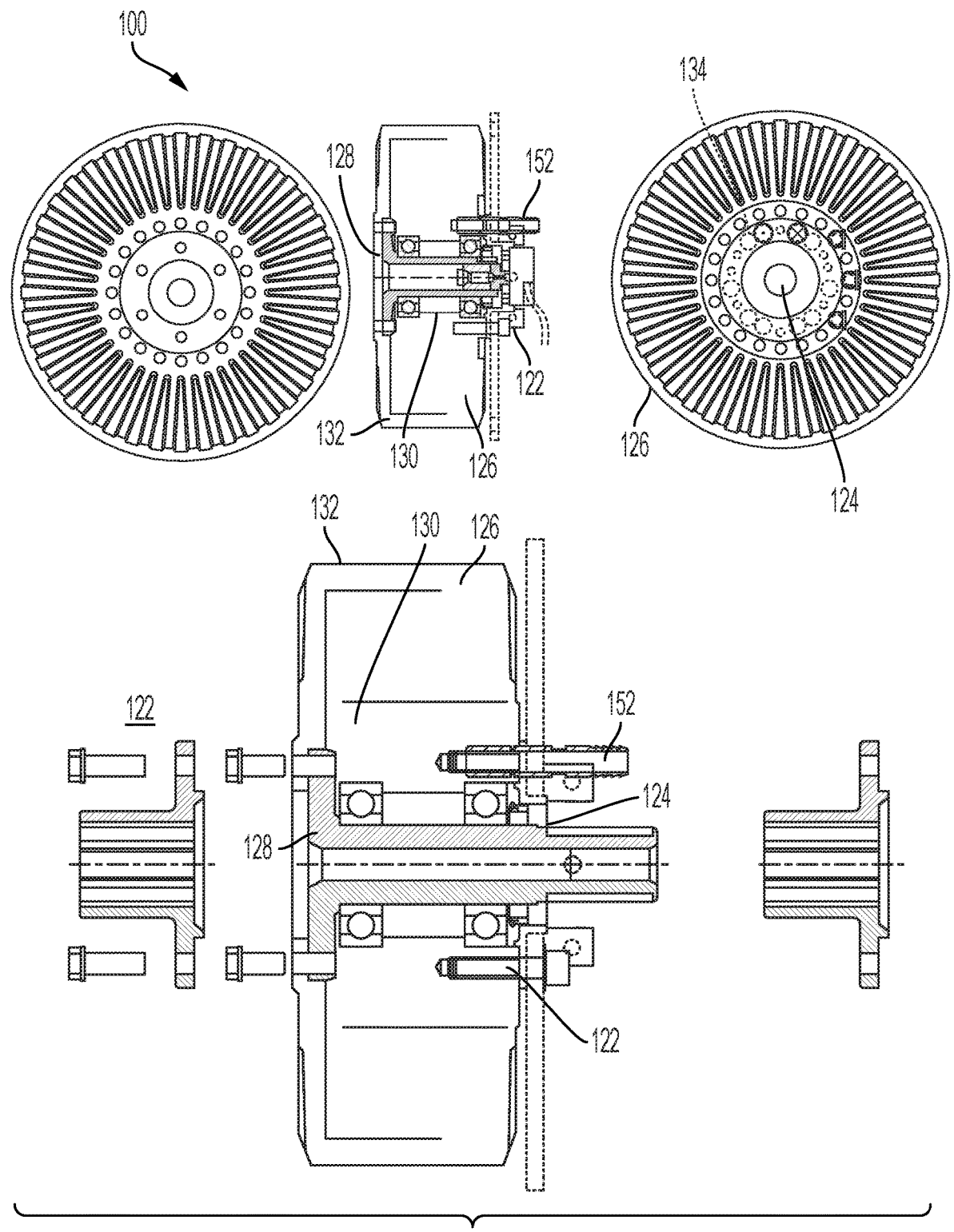
FIG. 10 depicts various views of the electric motor and cooling plate fittings and electrical connections.
Figure 11:
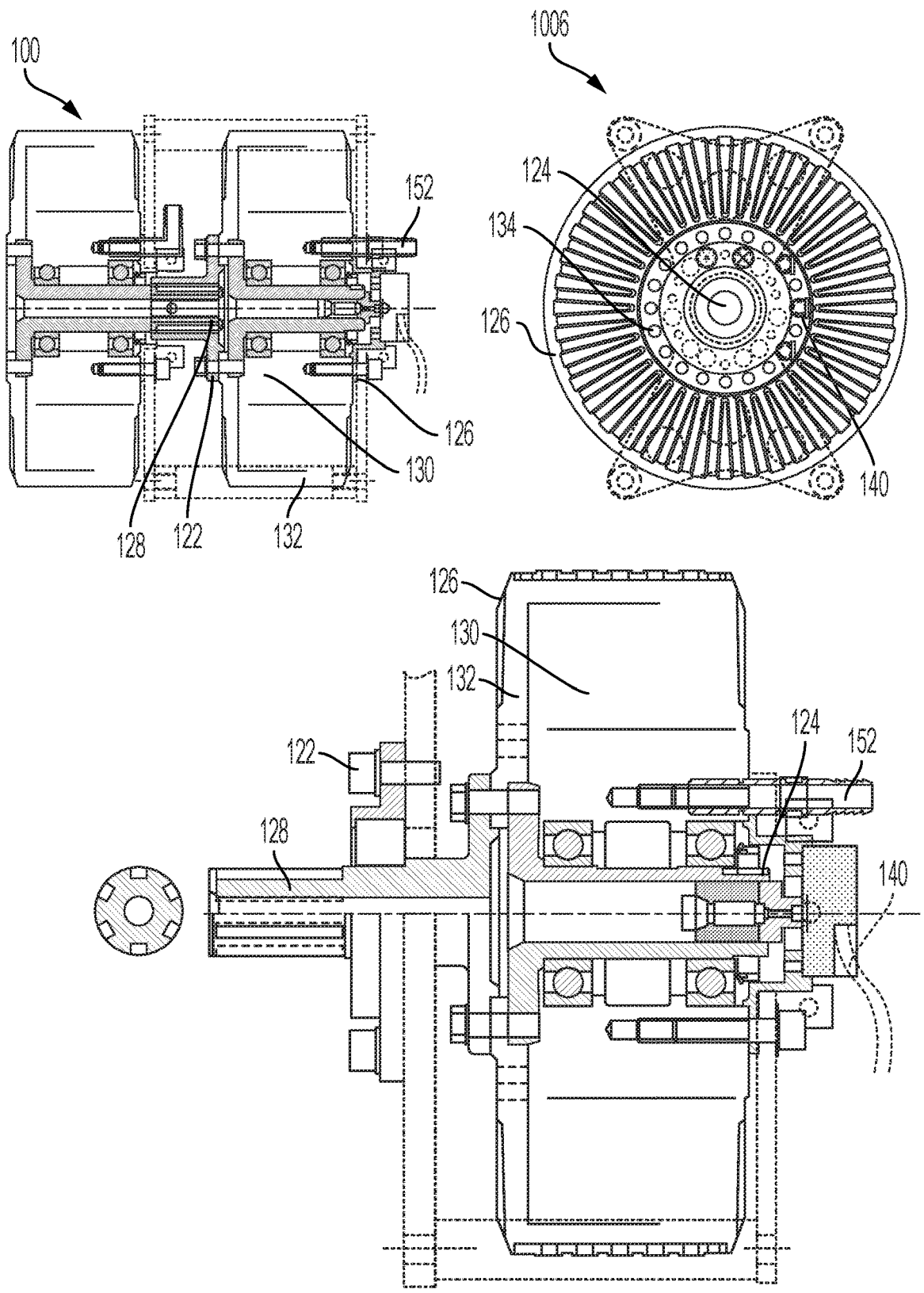
FIG. 11 depicts various side cutaway views of the electric motor and cooling plate fittings and electrical connections.

FIG. 8 and FIG. 9 depict various example views of electric motor 126 and cooling plate apparatus 100 fittings and electrical connections or wiring 140 corresponding to alternative electric motor sizes, configurations, and subcomponents including support brackets. The technique described herein may be applied to any of the subject electric motors, whether intended to be air cooled, liquid cooled, or a combination thereof. In one example embodiment, the invention is interconnected with an Emrax model 268 very high mechanical load, liquid-cooled axial flux synchronous permanent magnet sinusoidal three phase motor/generator. FIG. 10 and FIG. 11 depict cross-section and cutaway views of the electric motor 126, bores 120, 134, cooling plate fittings 146, 150, 152 and electrical connections or wiring 140 corresponding to FIGS. 8 and 9, demonstrating locations where fasteners 122 and electrical connectors or wiring 140 are attached or threaded into components.

Figure 12:
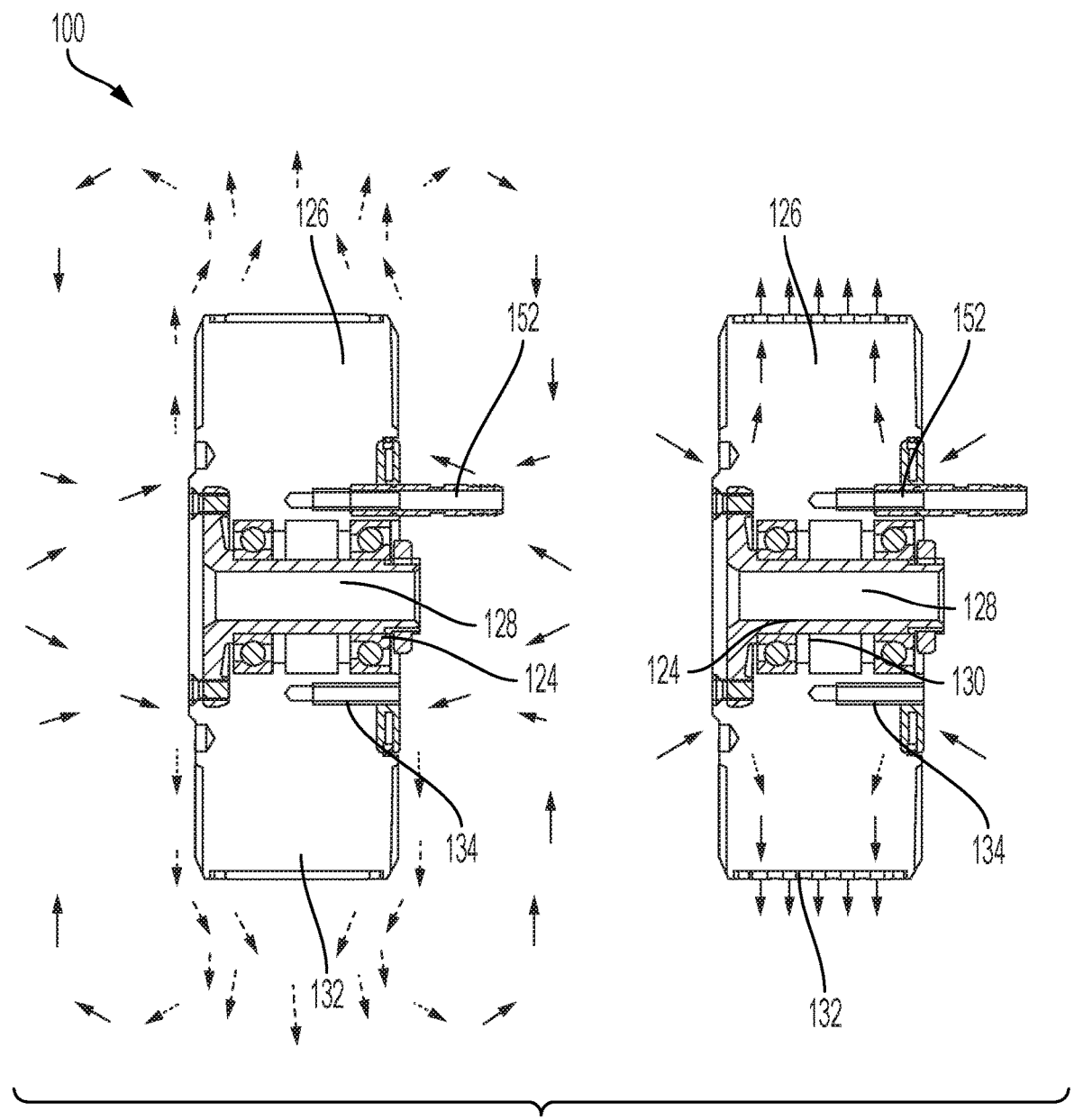
FIG. 12 depicts various side cutaway views of the electric motor and cooling plate fittings and cooling vectors.

FIG. 12 depicts an example illustrative diagram of cutaway views of the electric motor 126, bores 120, 134, cooling plate fittings 152 indicating example embodiment cooling vectors related to heat dissipation through radiation and the circulation of fluid coolant 118 to manage motor 126 operating temperatures.

Figure 13:
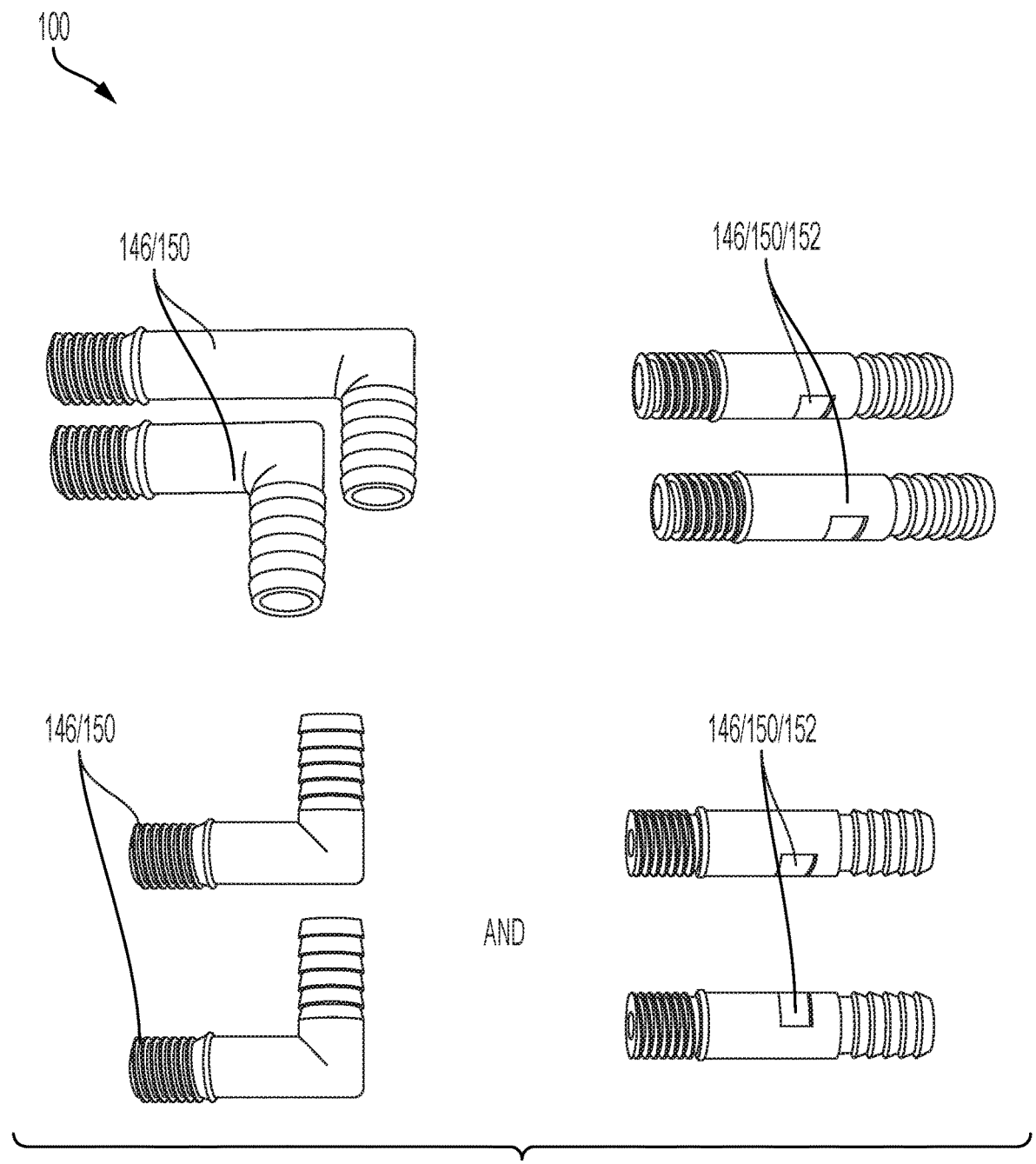
FIG. 13 depicts the cooling plate fittings in detail.

FIG. 13 depicts example diagram of the cooling plate fittings 146, 150, 152 in detail. As would be understood by one of skill in the art, various fittings known in the industry may be used to secure fluid conduits 142 and high pressure lines. In an example embodiment, subcomponent component fittings comprise the depicted NPT Fittings. These fittings may include straight fittings or fittings with perpendicular (90 degree) angles adjusting the axis along which fluid conduits 142 and high pressure lines 142 are fit.

Figure 14:
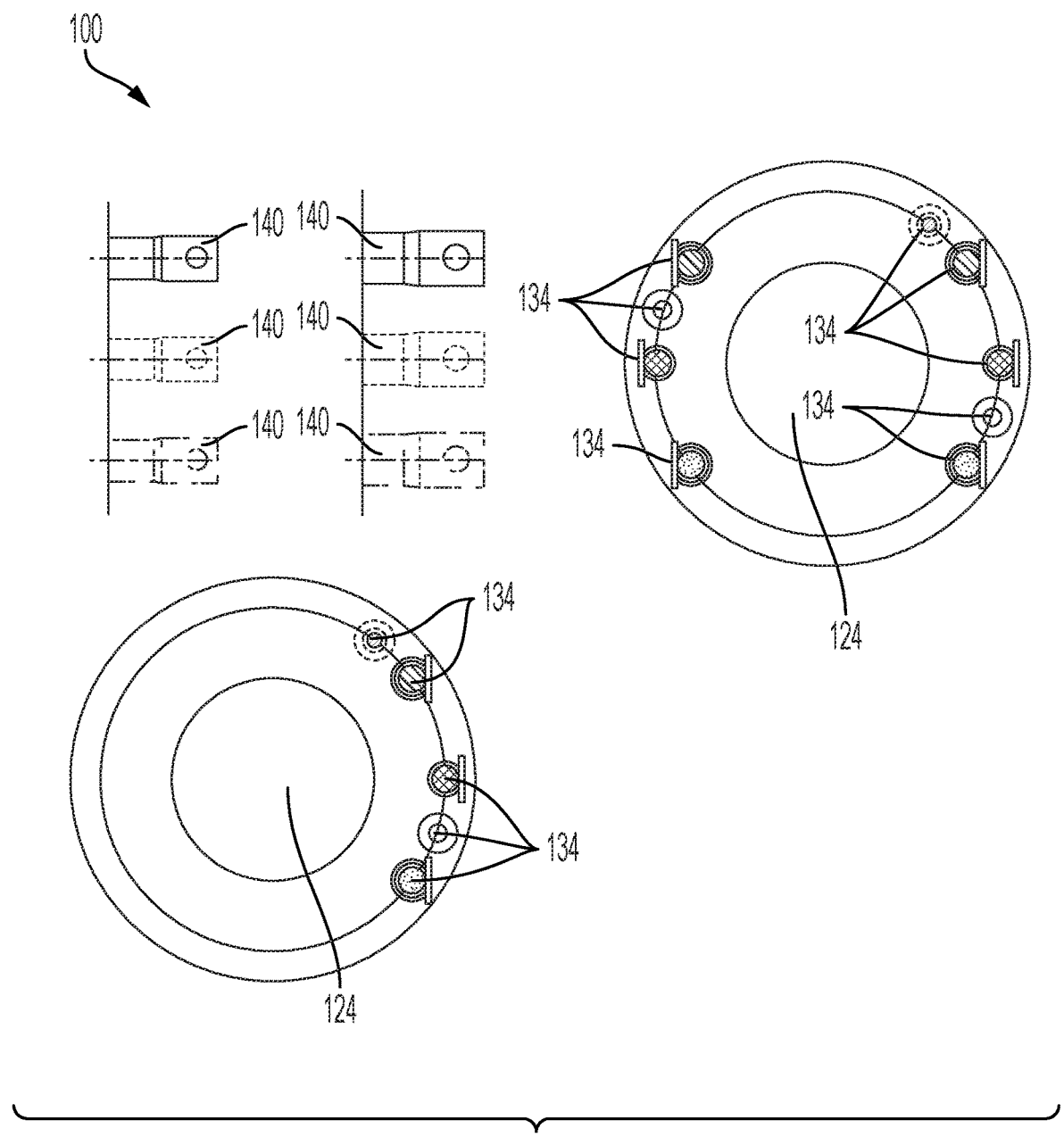
FIG. 14 depicts the electrical wiring components within the cooling plate apparatus.
Figure 15:
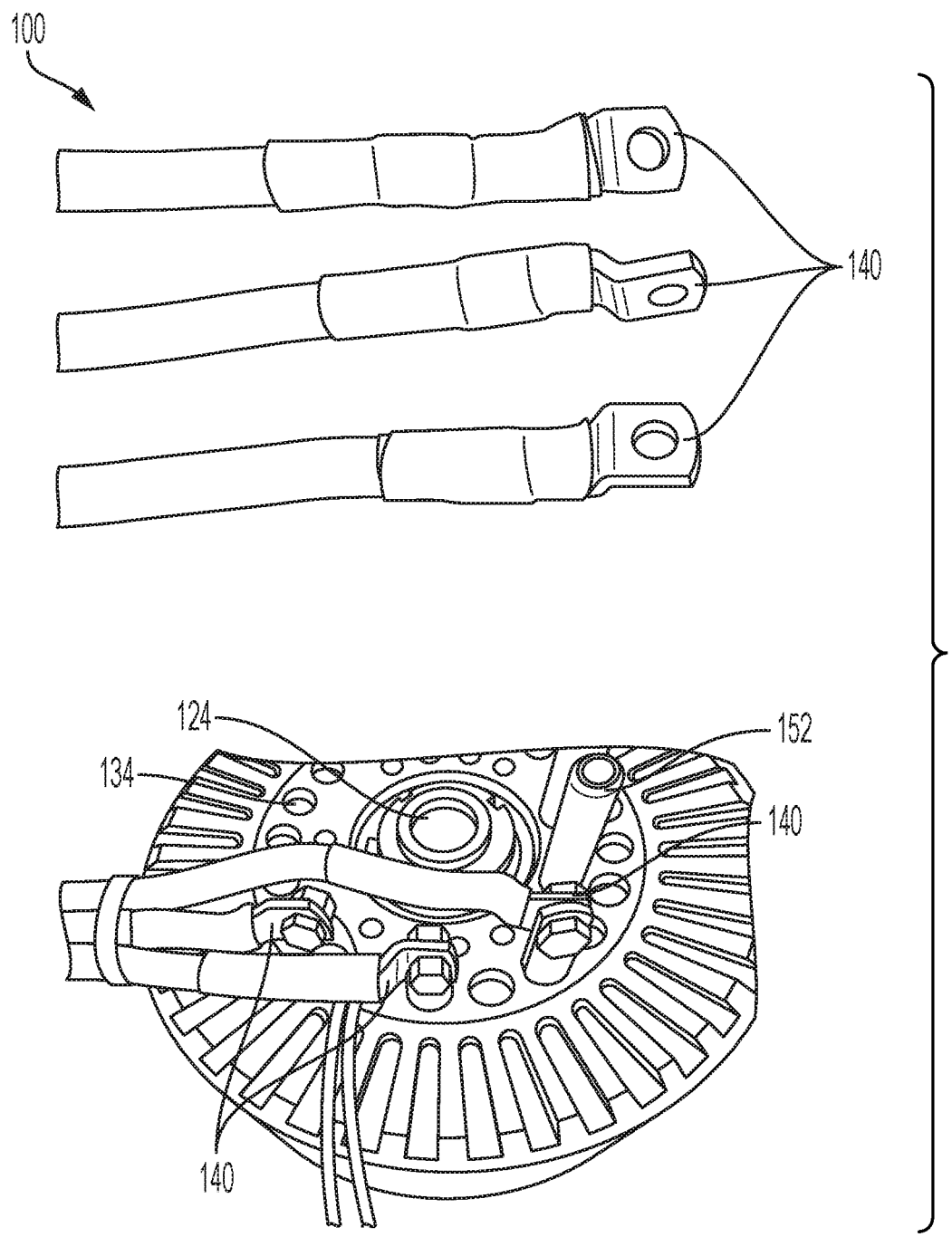
FIG. 15 depicts example detailed views of electrical connection and fluid conduit components.
Figure 16:
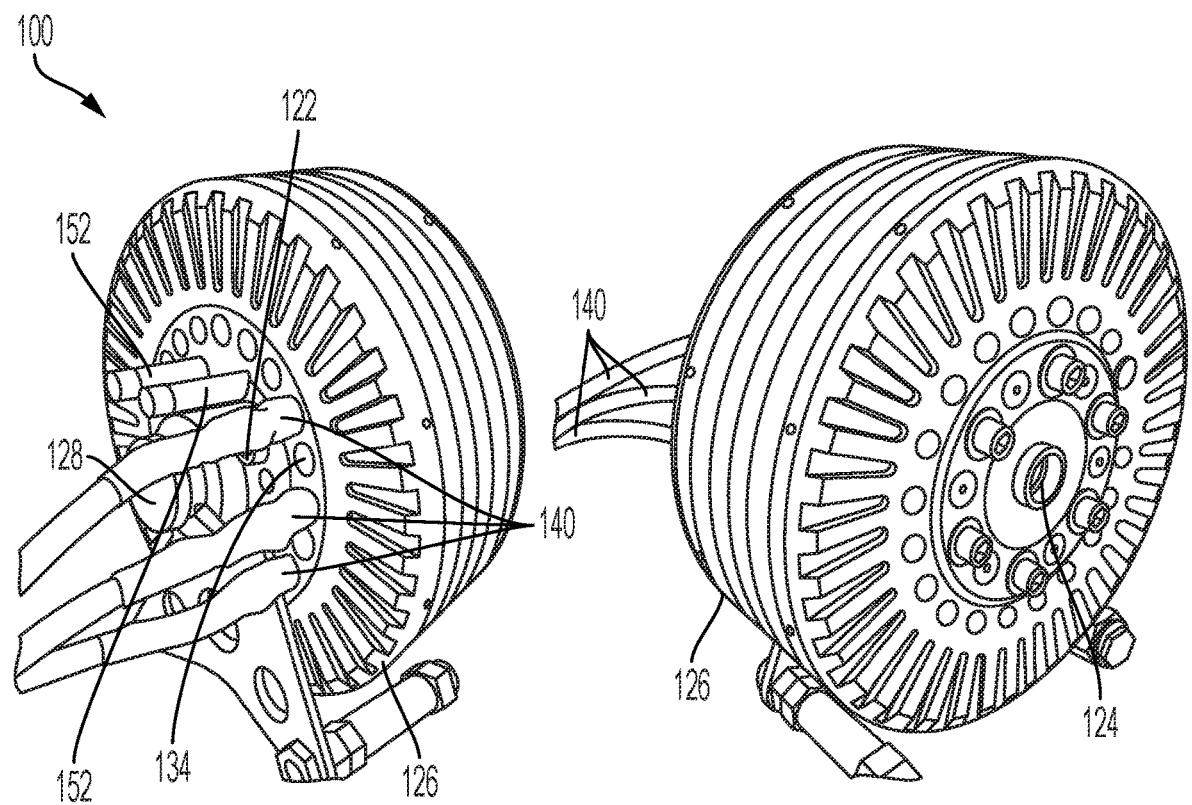
FIG. 16 depicts example detailed views of electrical wiring and fluid conduit components.
Figure 17A:
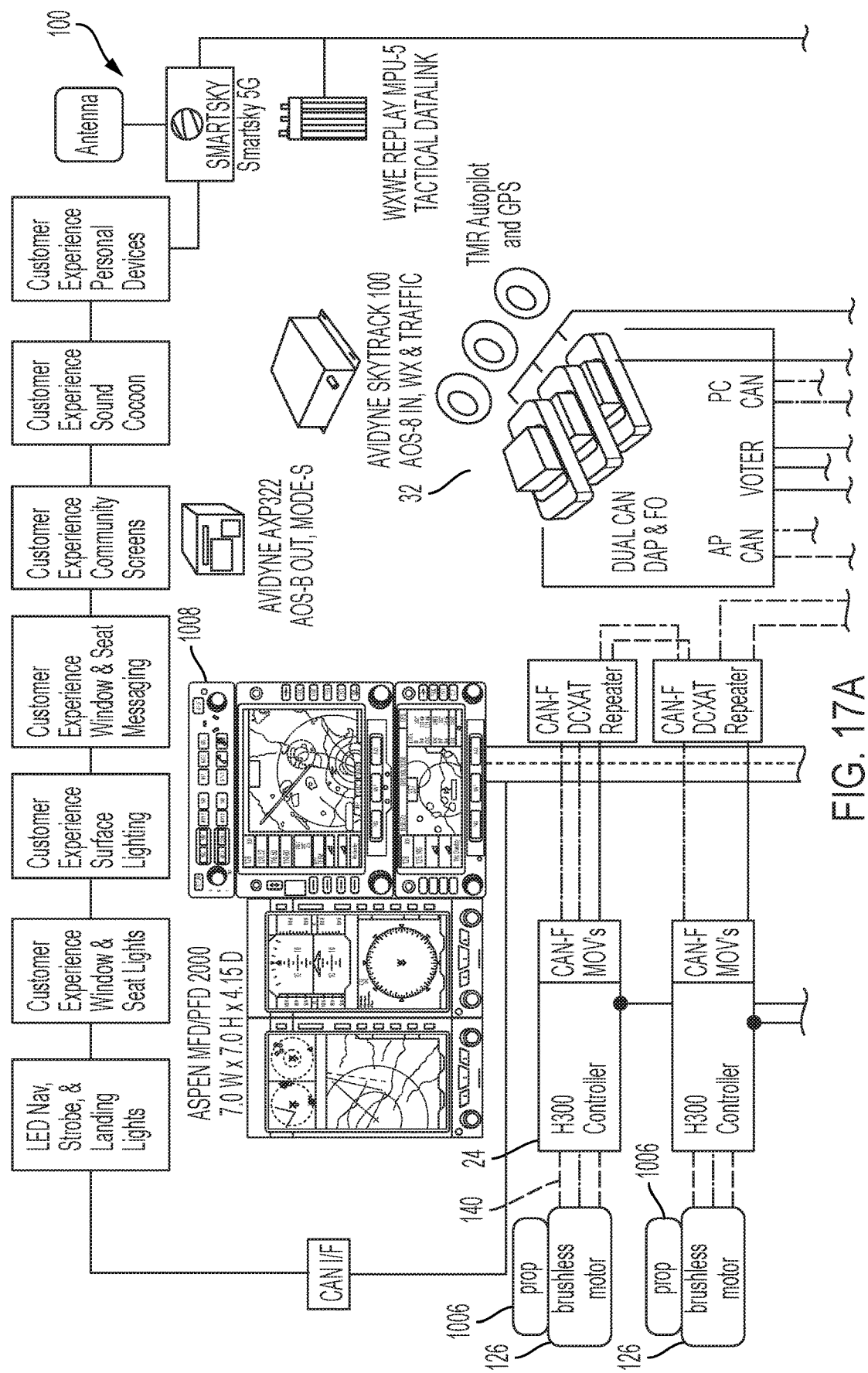
FIGS. 17A, 17B, 17C, 17D depict a system block diagram for practicing the present invention, including logic controlling the integrated system for multimode thermal energy transfer and related components.
Figure 17B:
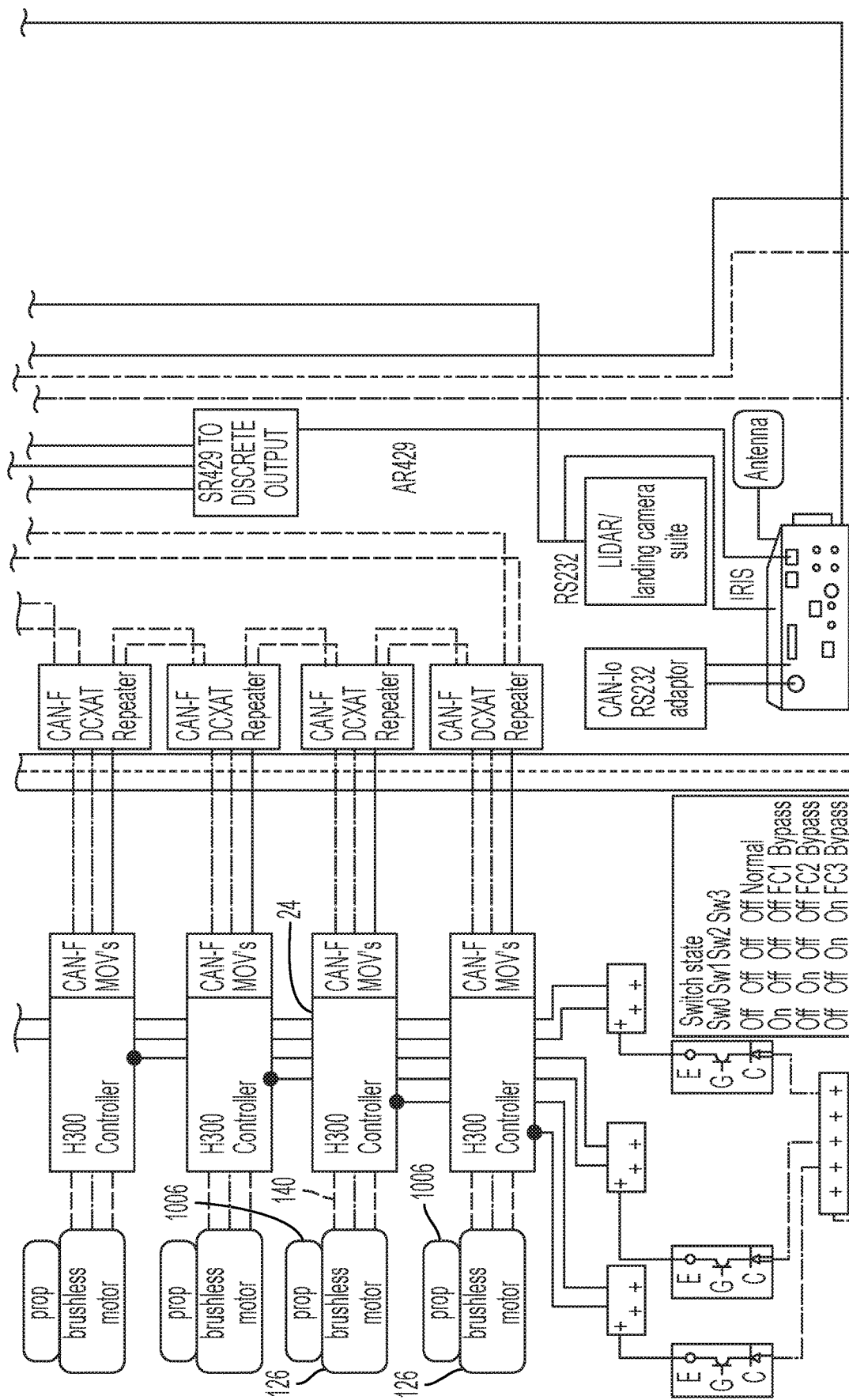
Figure 17C:
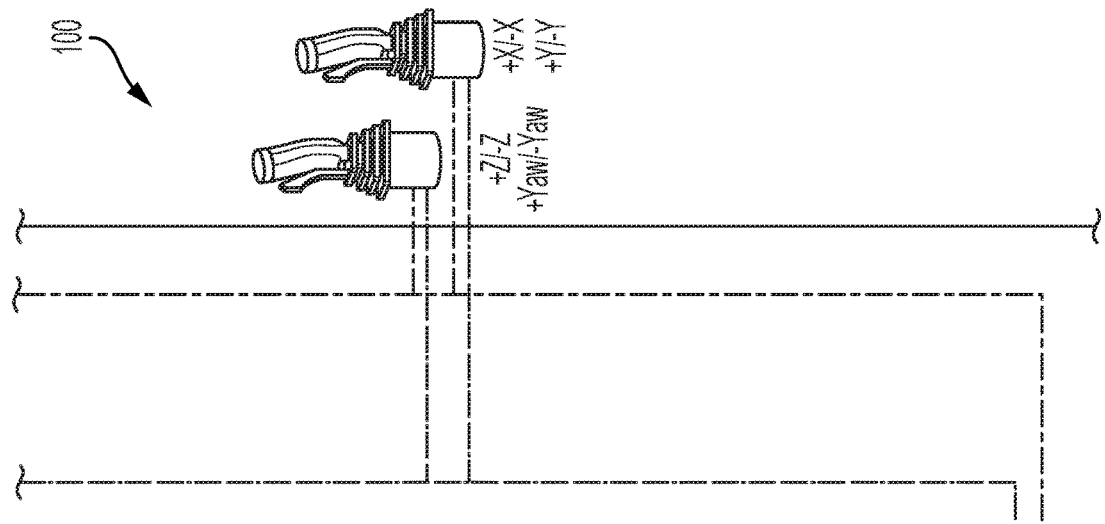
Figure 17C:
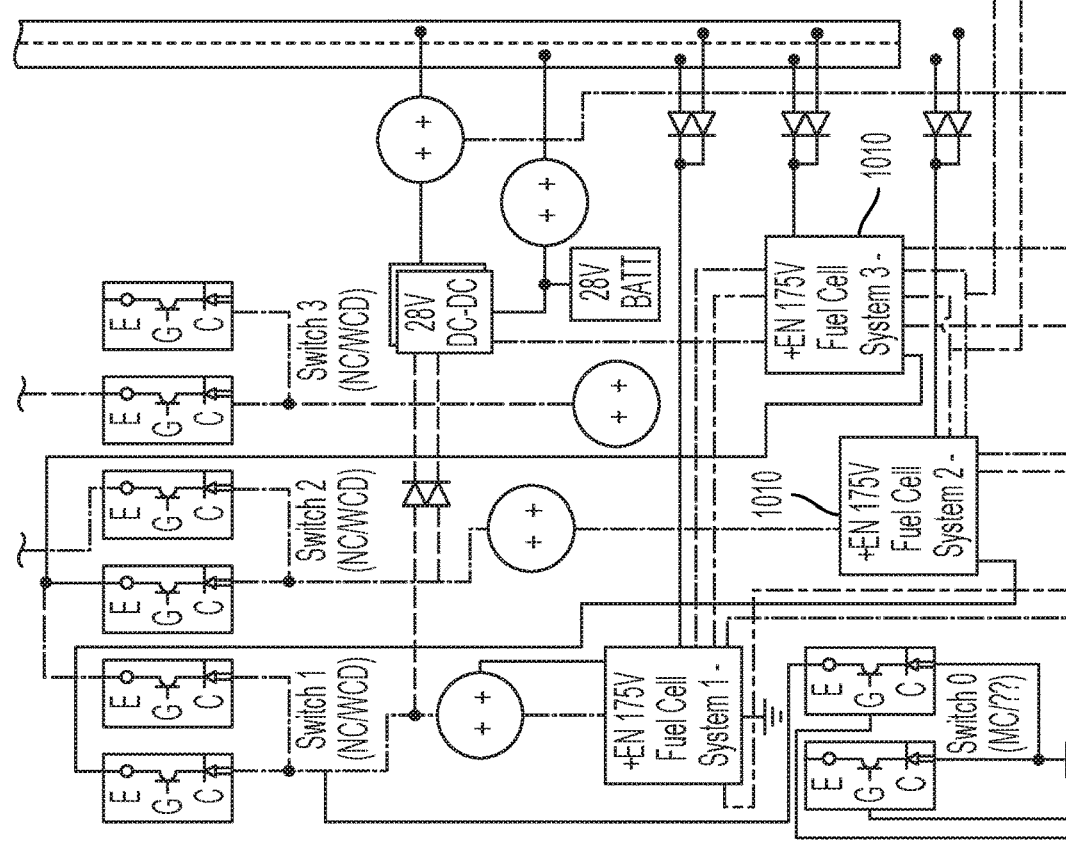
Figure 17D:
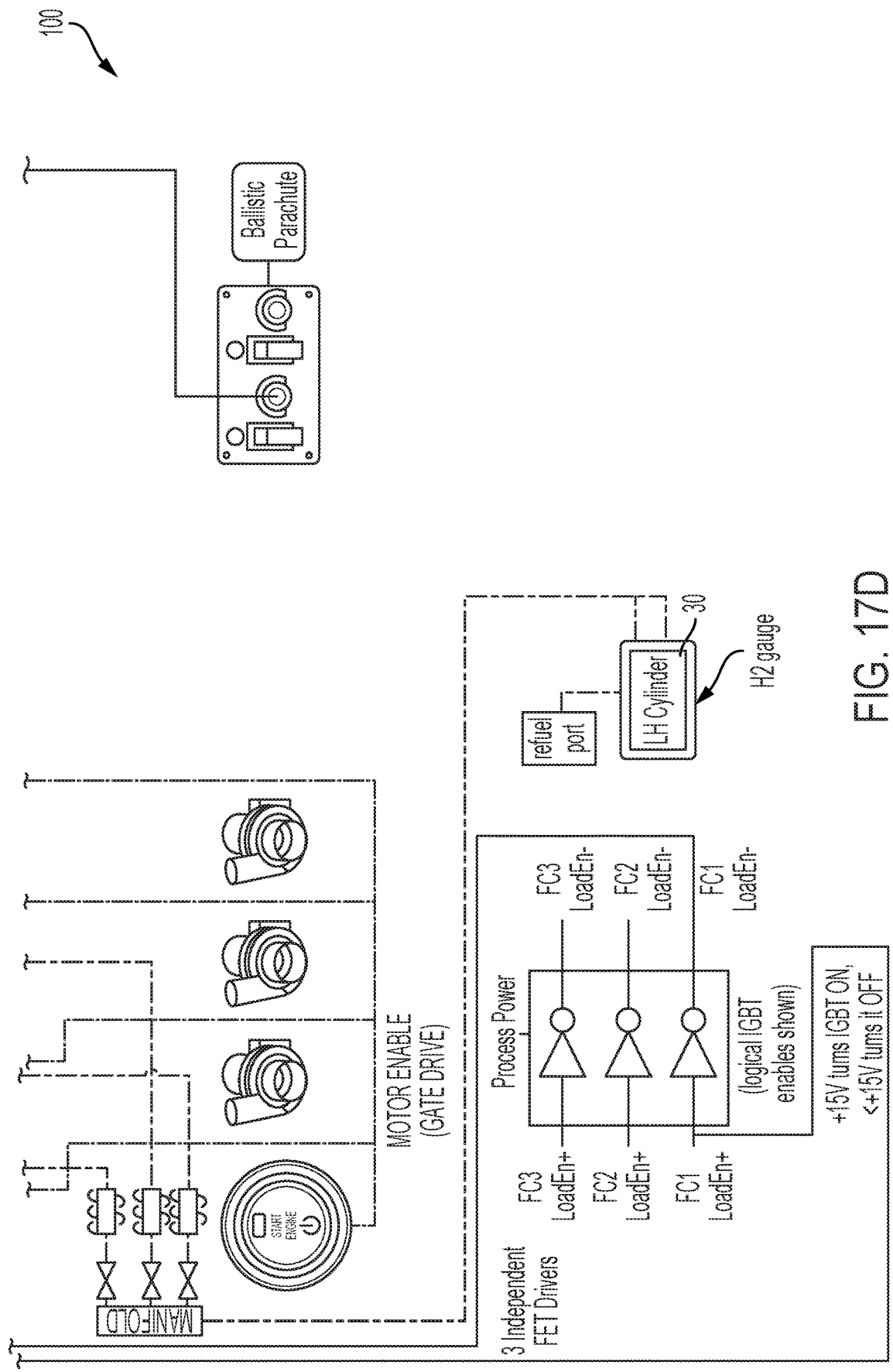

FIG. 14 depicts detailed views of an example of the electrical wiring 140 components for the cooling plate apparatus 100 including standard phase connectors 140. Electrical wiring 140 can include temperature sensors, or hall sensors used to monitor motor 126 operating conditions. In an alternative embodiment, phase connectors 140 may be doubled and wired in parallel. For motor control of the multiple motors and propellers 1006, there are three phases that connect from each high-current controller to each motor for a synchronous AC or DC brushless motor. Reversing the position of any two of the 3 phases will cause the motor to run the opposite direction. There is alternately a software setting within the motor controller that allows the same effect, but it is preferred to hard-wire it, since the designated motors running in the opposite direction must also have propellers 1006 with a reversed pitch (these are sometimes referred to as left-hand vs right-hand pitch, or puller (normal) vs pusher (reversed) pitch propellers, thereby forming the multiple motors and propellers 1006. Operating the motors in counter-rotating pairs cancels out the rotational torque that would otherwise be trying to spin the vehicle. FIG. 15 and FIG. 16 depict additional example detailed views of electrical connections, wiring and fluid conduit components. The electrical wires 140 that pass through and connect to the electric motor 126 can comprise one or more of power supply wires, three phase power connectors, temperature sensors, hall sensors, speed and position sensors, resolvers, tandem resolvers, encoders, sensors for synchronizing electrical and mechanical motor angle, or sensors for controlling position, direction and rotation speed of the electric motor; wherein additional wires of the electrical wires 140 pass through a central aperture 124 extending through the cooling plate apparatus 100 or the pass-through conduit for electrical wires 140. In an example embodiment, three phase power connectors of UVW type may be used, but in alternative embodiments, three phase power connectors can comprise doubled phase connectors (two UVW types), where one sequence has three phase connectors and double phase has six connectors for using 2 controllers with 1 motor Hall Sensors (HS) mounted in the electric motor 126. Most controllers use sensors for controlling position, direction and rotation speed of the motor 126. Sensor types that can be used include: resolvers, encoders or hall sensors, implemented using auto tuning (synchronizing the electrical and mechanical motor angle) and pre-setting of controller software. In an example embodiment, resolvers can be of the type LTN RE-15-1-A1 5 for unitek controllers, or TLTN RE-15-1-A1 5 for tandem resolver for two unitek controllers. In an alternative embodiment, encoders may be of the type RLS RM44SC (SSI) for emsiso controllers or RLS RM44AC (sin-cos) for sevcon controllers. Instead of resolvers/encoders, hall sensors can be used for controlling direction, position and rotation speed of the electric motor 126. Hall sensors can be of type SS411P. In an example embodiment, the temperature sensor that is mounted in or near the controller is connected to the controller. This sensor protects the motor 126 from overload. It is important to enable sufficient cooling of the motor 126 at any time. An example standard temperature sensor mounted into the motor 126 is a KTY 81-210. Temperature can also be measured with a thermal camera, and can be augmented with use of a fluid coolant pressure sensor.

FIGS. 17A, 17B, 17C, 17D depict in block diagram form one type of system that may be employed to carry out the present invention, including logic controlling the integrated system for thermal energy transfer and related components. Here, managing power generation for a personal aerial vehicle (PAV) or unmanned aerial vehicle (UAV) includes on-board equipment such as motor and propeller assemblies 1006, primary flight displays 1008, cooling source 1010 or thermal energy control subsystem 1010, an Automatic Dependent Surveillance-B (ADSB) transmitter/receiver, a global-positioning system (GPS) receiver typically embedded within, a fuel gauge, air data computer to calculate airspeed and vertical speed 38, and redundant flight computers (also referred to as autopilot computers). All of the aforementioned monitor either the operation and position of the aircraft 1000 or monitor and control the hydrogen-powered fuel cell based power generation subsystem generating electricity and fuel supply subsystems and provide display presentations that represent various aspects of those systems' operation and the aircraft's 1000 state data, such as altitude, attitude, ground speed, position, local terrain, recommended flight path, weather data, remaining fuel and flying time, motor voltage and current status, intended destination, and other information necessary to a successful and safe flight. In an example embodiment, a mission control tablet computer or sidearm controllers may transmit the designated route or position command set or the intended motion to be achieved to autopilot computers 32 and voter 42 motor controllers 24, and air data computer to calculate airspeed and vertical speed 38. In some embodiments, fuel tank, the avionics battery, the fuel pump and cooling system, and a starter/alternator may also be included, monitored, and controlled. Any fuel cells are fed by on-board fuel tank and use the fuel to produce a source of power for the multirotor aircraft 1000. The fuel cell based power generation subsystem combines stored hydrogen with compressed air to generate electricity with a byproduct of only water and heat, thereby forming a fuel cell module that can also include a fuel pump and cooling system. The system implements pre-designed fault tolerance or graceful degradation that creates predictable behavior during anomalous conditions with respect to at least the following systems and components: 1) flight control hardware; 2) flight control software; 3) flight control testing; 4) motor control and power distribution subsystem; 5) motors; and 6) fuel cell power generation subsystem. The plurality of motor controllers can be high-voltage, high-current liquid-cooled or air-cooled controllers. The system can further comprise a mission planning computer comprising software, with wired or wireless (RF) connections to the one or more autopilot control units, and a wirelessly connected or wire-connected ADSB unit providing the software with collision avoidance, traffic, emergency detection and weather information to and from the clean fuel aircraft 1000. The one or more autopilot control units comprising a computer processor and input/output interfaces can comprise at least one of interface selected from serial RS232, Controller Area Network (CAN), Ethernet, analog voltage inputs, analog voltage outputs, pulse-width-modulated outputs for motor control, an embedded or stand-alone air data computer, an embedded or stand-alone inertial measurement device. The one or more autopilot control units can operate control algorithms to generate commands to each of the plurality of motor controllers, managing and maintaining multirotor aircraft stability for the clean fuel aircraft, and monitoring feedback. The method can repeat measuring, using one or more temperature sensing devices or thermal energy sensing devices, operating conditions in a multirotor aircraft, and then performs comparing, computing, selecting and controlling, and executing steps using data for the one or more fuel cell modules to iteratively manage electric voltage and current or torque production and supply by the one or more fuel cell modules and operating conditions in the multirotor aircraft. The autopilot is also responsible for measuring other vehicle state information, such as pitch, bank angle, yaw, accelerations, and for maintaining vehicle stability using its own internal sensors and available data.

The command interface between the autopilots and the multiple motor controllers will vary from one equipment set to another, and might entail such signal options to each motor controller as a variable DC voltage, a variable resistance, a CAN, Ethernet or other serial network command, an RS-232 or other serial data command, or a PWM (pulse-width modulated) serial pulse stream, or other interface standard obvious to one skilled in the art, which may be transmitted in electrical (fly by wire) or optical (fly by light) format. Control algorithms operating within the autopilot computer perform the necessary state analysis, comparisons, and generate resultant commands to the individual motor controllers and monitor the resulting vehicle state and stability. Electrical energy to operate the vehicle is derived from the fuel cell modules, which provide voltage and current to the motor controllers through optional high-current diodes or Field Effect Transistors (FETs) and circuit breakers. The motor controllers each individually manage the necessary voltage and current to achieve the desired thrust by controlling the motor in either RPM mode or torque mode, to enable thrust to be produced by each motor and propeller/rotor combination. The number of motor controllers and motor/propeller combinations per vehicle may be as few as 4, and as many as 16 or more, depending upon vehicle architecture, desired payload (weight), fuel capacity, electric motor size, weight, and power, and vehicle structure.

Figure 18:
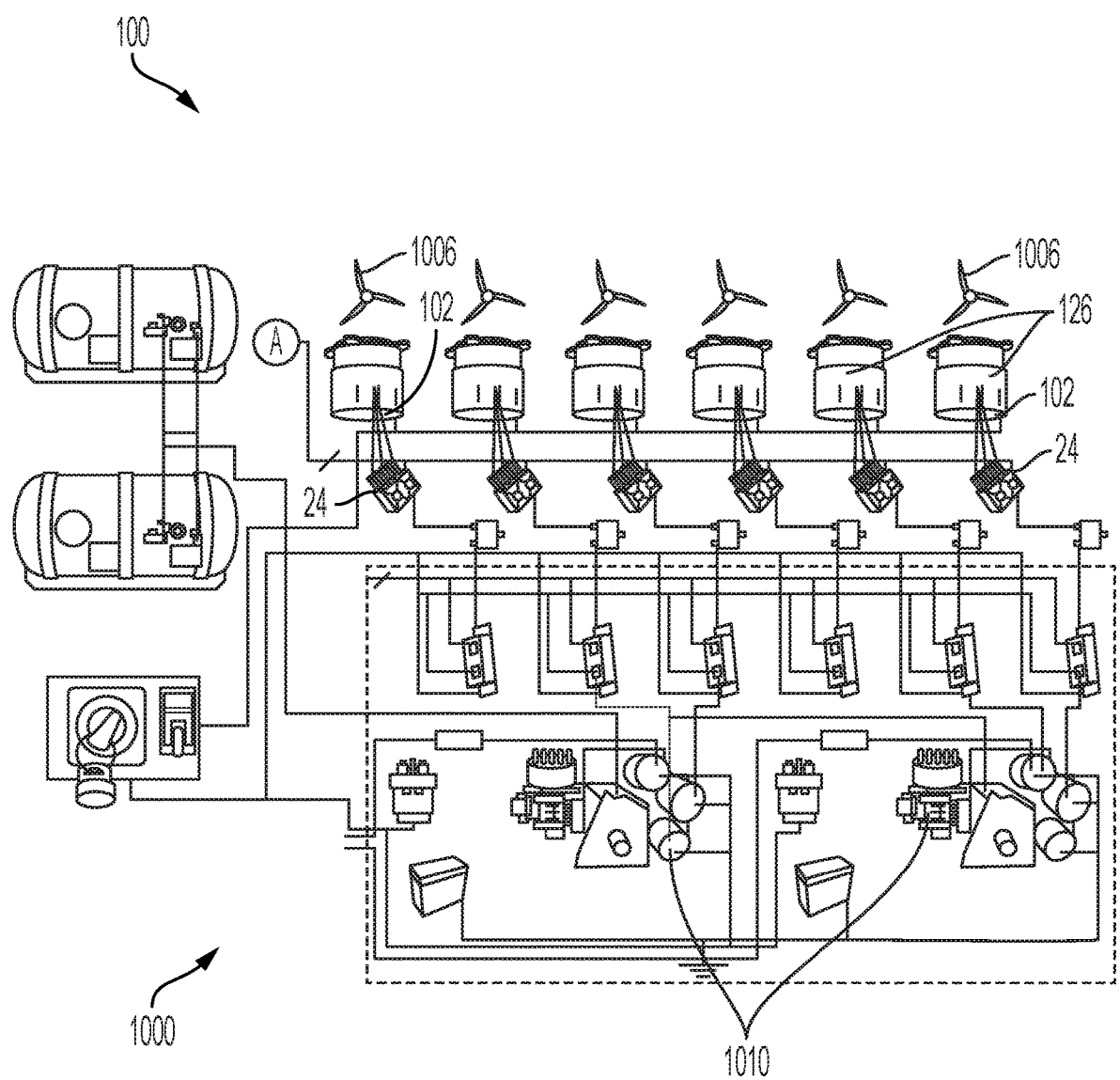
FIG. 18 depicts an example system diagram of electrical and systems connectivity for various control interface components of a system of the invention.

FIG. 18 depicts an example system diagram of electrical and systems connectivity for various control interface components of a system of the invention, including logic controlling the generation, distribution, adjustment and monitoring of electrical power (voltage and current). Pairs of motors for the multiple motors 126 and propellers 1006 are commanded to operate at different RPM or torque settings (determined by whether the autopilot is controlling the motors in RPM or torque mode) to produce slightly differing thrust amounts from the pairs of counter-rotating motors and propellers 1006 under autopilot control, thus imparting a pitch moment, or a bank moment, or a yaw moment, or a change in altitude, or a lateral movement, or a longitudinal movement, or simultaneously any combination of the above to the aircraft 1000, using position feedback from the autopilot's 6-axis built-in or remote inertial sensors to maintain stable flight attitude. Sensor data is read by each autopilot to assess its physical motion and rate of motion, which is then compared to commanded motion in all three dimensions to assess what new motion commands are required. Depending on the equipment and protocols involved in the example embodiment, a sequence of commands may be sent using a repeating series of servo control pulses carrying the designated command information, represented by pulse-widths varying between 1.0 to 2.0 milliseconds contained within a 'frame' of, for example, 10 to 30 milliseconds). In this way, multiple channels of command information are multiplexed onto a single serial pulse stream within each frame. The motor's RPM is determined by the duration of the pulse that is applied to the control wire. In another embodiment, motor commands may be transmitted digitally from the autopilot to the motor controllers 24 and status and/or feedback may be returned from the motor controllers 24 to the autopilot using a digital databus such as Ethernet or CAN (Controller Area Network), one of many available digital databusses capable of being applied.

In a preferred control embodiment, the commanded vehicle motion and engine or motor rpm commands could also be embodied by a pair of joysticks or sidearm controllers, where the joysticks/sidearm controllers provide readings (which could be potentiometers, hall-effect sensors, or rotary-variable differential transformers (RVDT)) indicative of commanded motions which may then be translated into the appropriate message format and transmitted to the autopilot computers 32 by network commands or signals, and thereby used by the autopilots to control the multiple motor controllers, motors and propellers/rotors 1006. The sidearm controller or joystick could also be embodied in a 'steering wheel' or control yoke capable of left-right and fore-aft motion, where the 2-axis joystick or control yoke provides two independent sets of single- or dual-redundant variable voltage or potentiometer settings indicative of pitch command (nose up or nose down) and bank command (left side up or left side down). Alternatively, instead of pitch and roll motions, the autopilot may also be capable of generating 'go left', 'go right' 'go forward' 'go backward', 'yaw left' or 'yaw right' commands, all while the autopilot is simultaneously maintaining the vehicle in a stable, level or approximately level state. This latter control means offers greater comfort for the passenger(s) since it is more similar to ground-based vehicle motions (such as an automobile) than an air vehicle such as a winged aircraft.

When combined with avionics, instrumentation and display of the aircraft's 1000 current and intended location, the set of equipment enables the operator, whether inside the vehicle, on the ground via datalink, or operating autonomously through assignment of a pre-planned route, to easily and safely operate and guide the aircraft 1000 to its intended destination. Electrical operating characteristics/data for each motor are controlled and communicated to the voting system for analysis and decision making. Communication to the motor controllers 24 happens (in this embodiment) between autopilot and motor controller 24 via CAN, a digital network protocol, with fiber optic transceivers inline to protect signal integrity. Flight control hardware may comprise, for example, a redundant set of flight controllers with processors, where each comprises: three (3) Accelerometers, three (3) gyros, three (3) magnetometers, two (2) barometers, and at least one (1) GPS device, although the exact combinations and configurations of hardware and software devices may vary. Measured parameters related to motor performance include motor temperature, IGBT temperature, voltage, current, torque, and revolutions per minute (RPM). Values for these parameters in turn correlate to the thrust expected under given atmospheric, power and pitch conditions.

The fuel cell control system may have various numbers of fuel cells based on the particular use configuration, for example a set of three hydrogen fuel cells configured for fault-tolerance. One or more flight control algorithms stored within the autopilot will control and monitor the power delivered by the fuel cells via CAN. The triple-modular redundant auto-pilot can detect the loss of any one fuel cell and reconfigure the remaining fuel cells using a form of cross connection, thus ensuring that the fuel cell system is capable of continuing to operate the aircraft 1000 to perform a safe descent and landing.

The combination of the avionics display system coupled with the ADSB capability enables the multirotor aircraft 1000 to receive broadcast data from other nearby aircraft, and to thereby allow the multirotor aircraft 1000 to avoid close encounters with other aircraft; to broadcast own-aircraft position data to avoid close encounters with other cooperating aircraft; to receive weather data for display to the pilot and for use by the avionics display system within the multirotor aircraft 1000; to allow operation of the multirotor aircraft 1000 with little or no requirement to interact with or communicate with air traffic controllers; and to perform calculations for flight path optimization, based upon own-aircraft state, cooperating aircraft state, and available flight path dynamics under the National Airspace System, and thus achieve optimal or near-optimal flight path from origin to destination.

Figure 19:
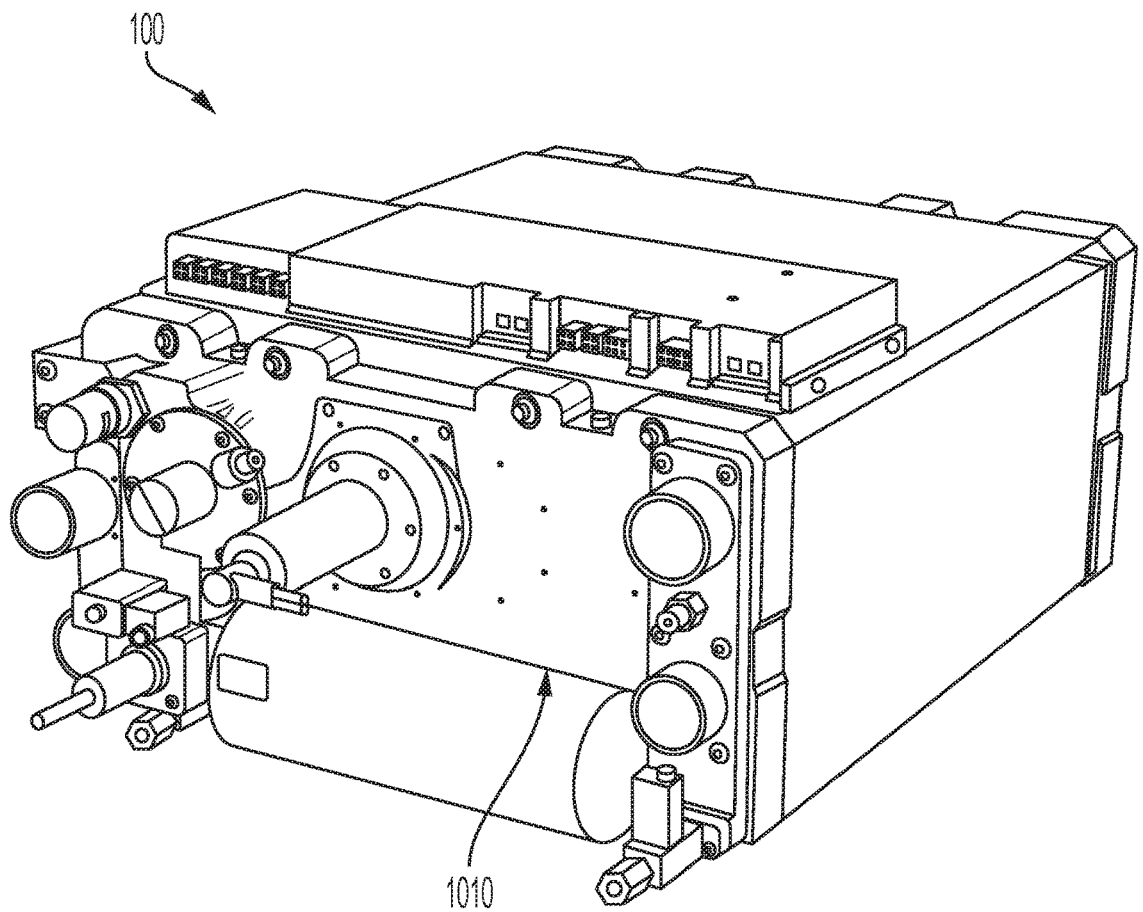
FIG. 19 depicts example configurations of fuel cells within the multirotor aircraft and example subcomponents of fuel cells in at least one fuel cell module within the multirotor aircraft.
Figure 19:
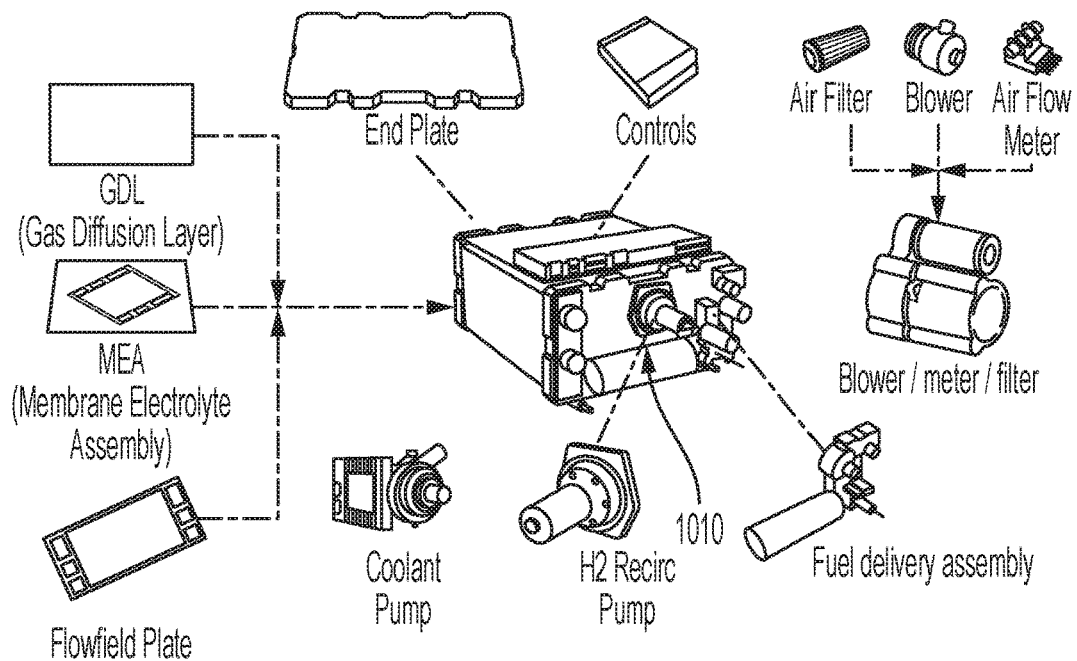

FIG. 19 depicts example configurations of components within the multirotor aircraft 1000 including subcomponents of fuel cells in at least one fuel cell module within the power generation subsystems of the multirotor aircraft 1000. In one embodiment, an aviation fuel cell module comprises one or more hydrogen-powered fuel cells, where each hydrogen-powered fuel cell is fueled by gaseous hydrogen ($GH_2$) or liquid hydrogen ($LH_2$), a multi-function stack end plate comprising an integrated manifold, air filters, blower, airflow meter, fuel delivery assembly, recirculation pump, coolant pump, fuel cell controls, sensors, end plate, at least one gas diffusion layer (GDL), at least one membrane electrolyte assembly, anode and cathode volumes on each side of a proton exchange membrane of the membrane electrolyte assembly with backing layers and catalyst layers, at least one flowfield plate, fluid coolant conduits 142, connections or junctions, a hydrogen inlet, a coolant inlet, a coolant outlet, one or more air-driven turbochargers, and coolant conduits connected to and in fluid communication with the one or more fuel cell modules and transporting fluid coolant 118, an integrated wiring harnesses, integrated electronics and controls. The integrated electronics and controls may operate as temperature sensors or thermal energy sensors for the fuel cell modules, and may also be integrated into the heat transfer infrastructure architecture of the fuel cell modules such that the excess heat generated by operation may also be transferred away from the electronics and controls to promote more efficient operation and reduce overheating. The aviation fuel cell modules may be further configured of aerospace lightweight metallic fuel cell components. In an example embodiment, a fuel cell module 18 may produce 120 kW of power, in a configuration with dimensions of 72×12×24 inches (L×H×W) and a mass of less than 120 kg. The one or more fuel cell modules combine hydrogen from the fuel tank with air to supply electrical voltage and current. Fuel cell vessels and piping are designed to the ASME Code and DOT Codes for the pressure and temperatures involved.

Figure 20:
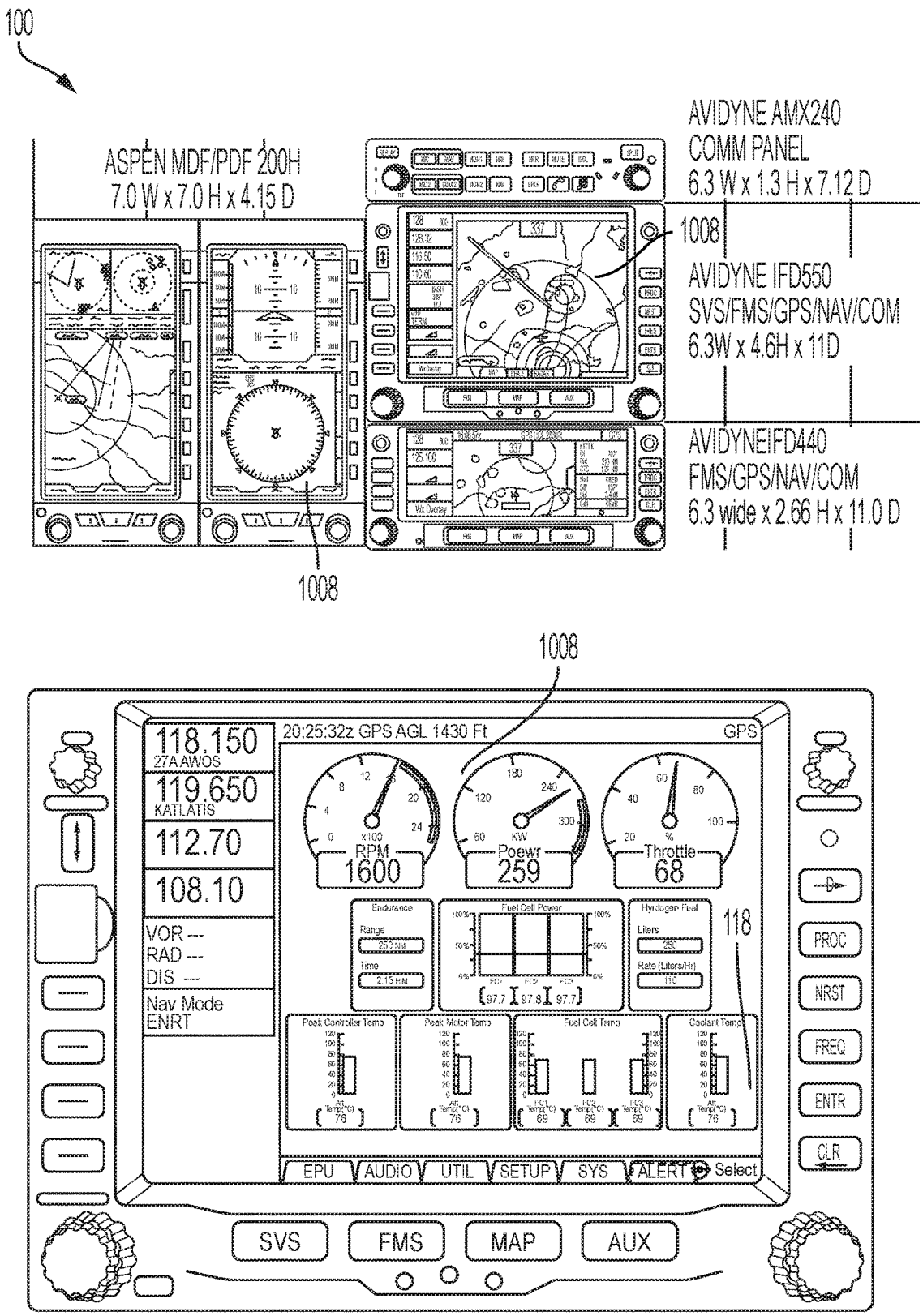
FIG. 20 depicts an example of control panels, gauges and sensor output for the multirotor aircraft.

FIG. 20 depicts an example of control panels, gauges and sensor output for the multirotor aircraft. In the illustrated embodiment, the operational analyses and control algorithms described herein are performed by the on-board autopilot computer, and flight path and other useful data are presented on the avionics displays that can include a simplified computer and display with an arrangement of standard avionics used to monitor and display operating conditions, control panels, gauges and sensor output for the clean fuel VTOL aircraft. In one example embodiment a display presentation can be provided to show coolant temperature as well as fuel cell operating conditions including fuel remaining, fuel cell temperature and motor performance related to each of the respective fuel cell modules (bottom) as well as weather data (in the right half) and highway in the sky data (in the left half) derived from electronically connected sensors including temperature sensors. Also shown are the vehicle's GPS airspeed (upper left vertical bar) and GPS altitude (upper right vertical bar). Magnetic heading, bank and pitch are also displayed, to present the operator with a comprehensive, 3-dimensional representation of where the aircraft 1000 is, how it is being operated, and where it is headed. Other screens can be selected from a touch-sensitive row of buttons along the lower portion of the screen.

Figure 21:
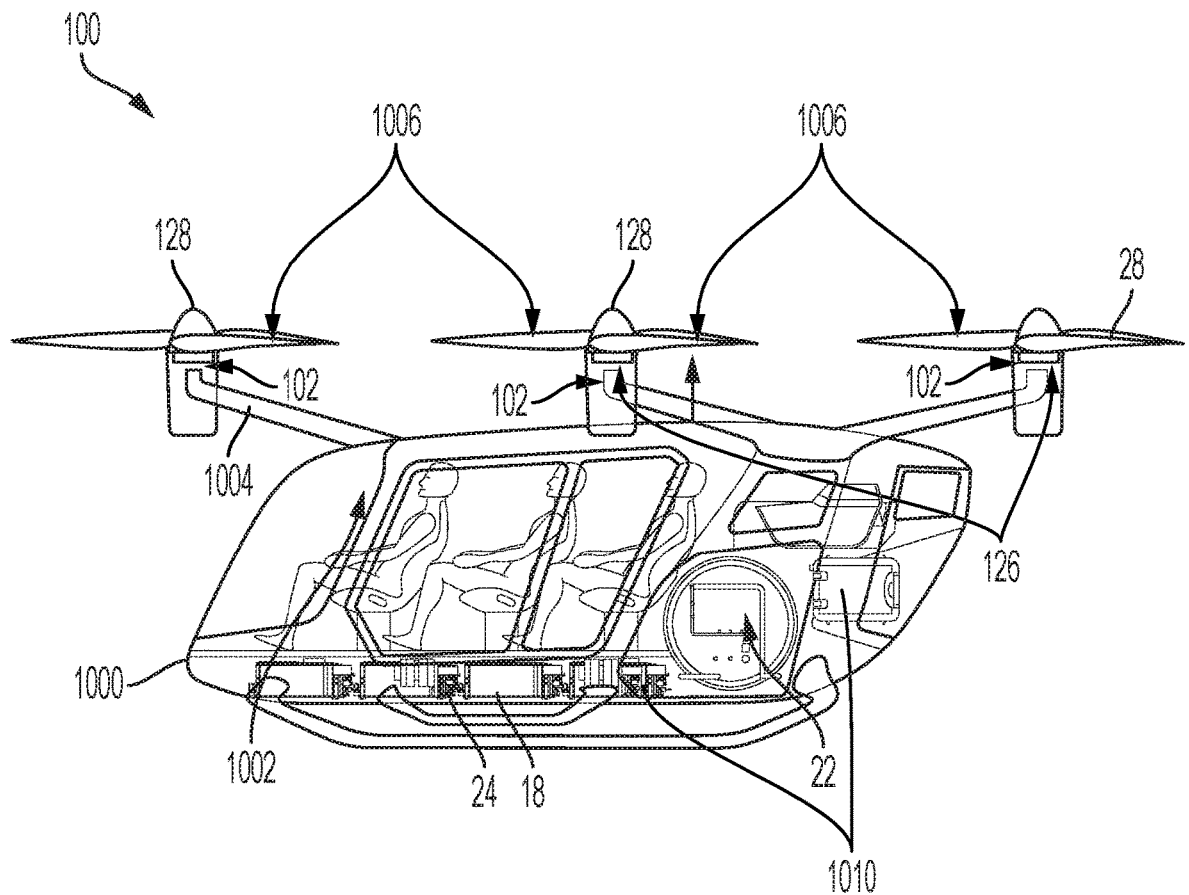
FIG. 21 depicts profile diagrams of the multirotor aircraft demonstrating example positions of fuel supply system components and power generation subsystems and cooling plates within the multirotor aircraft.
Figure 21:
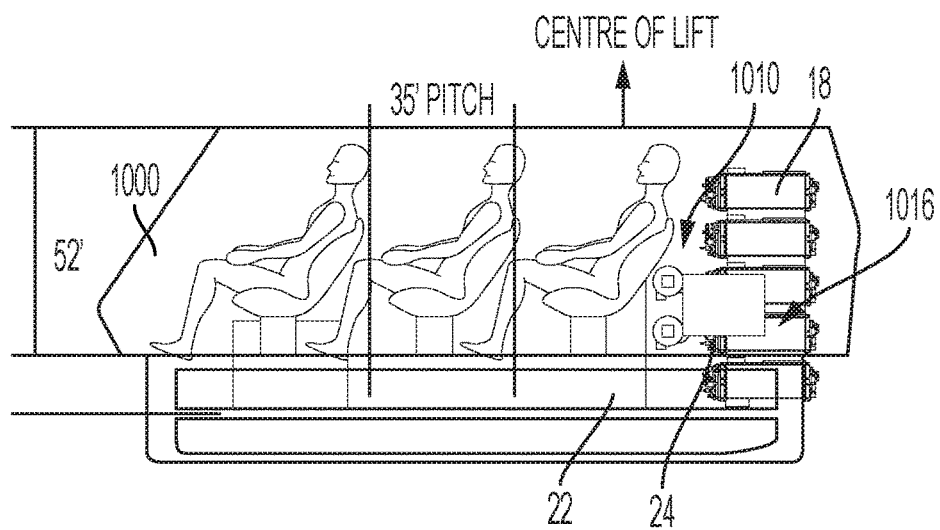
Figure 22:
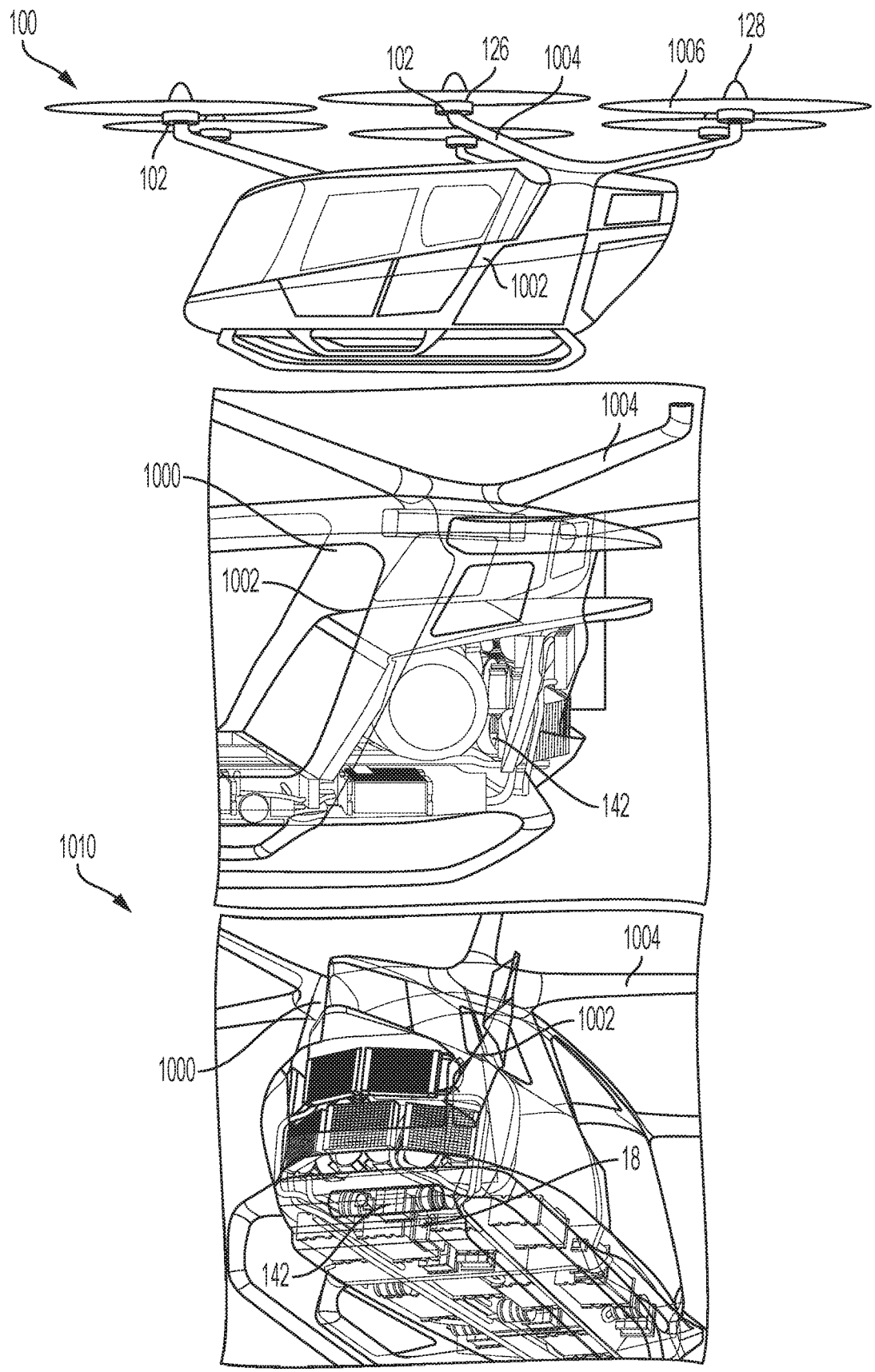
FIG. 22 depicts example diagrams of the configuration of power generation subsystem heat transfer and exchange source components within the multirotor aircraft that depicts two views demonstrating the position and compartments housing the fuel supply and power generation subsystems depicting fluid coolant conduits.
Figure 23:
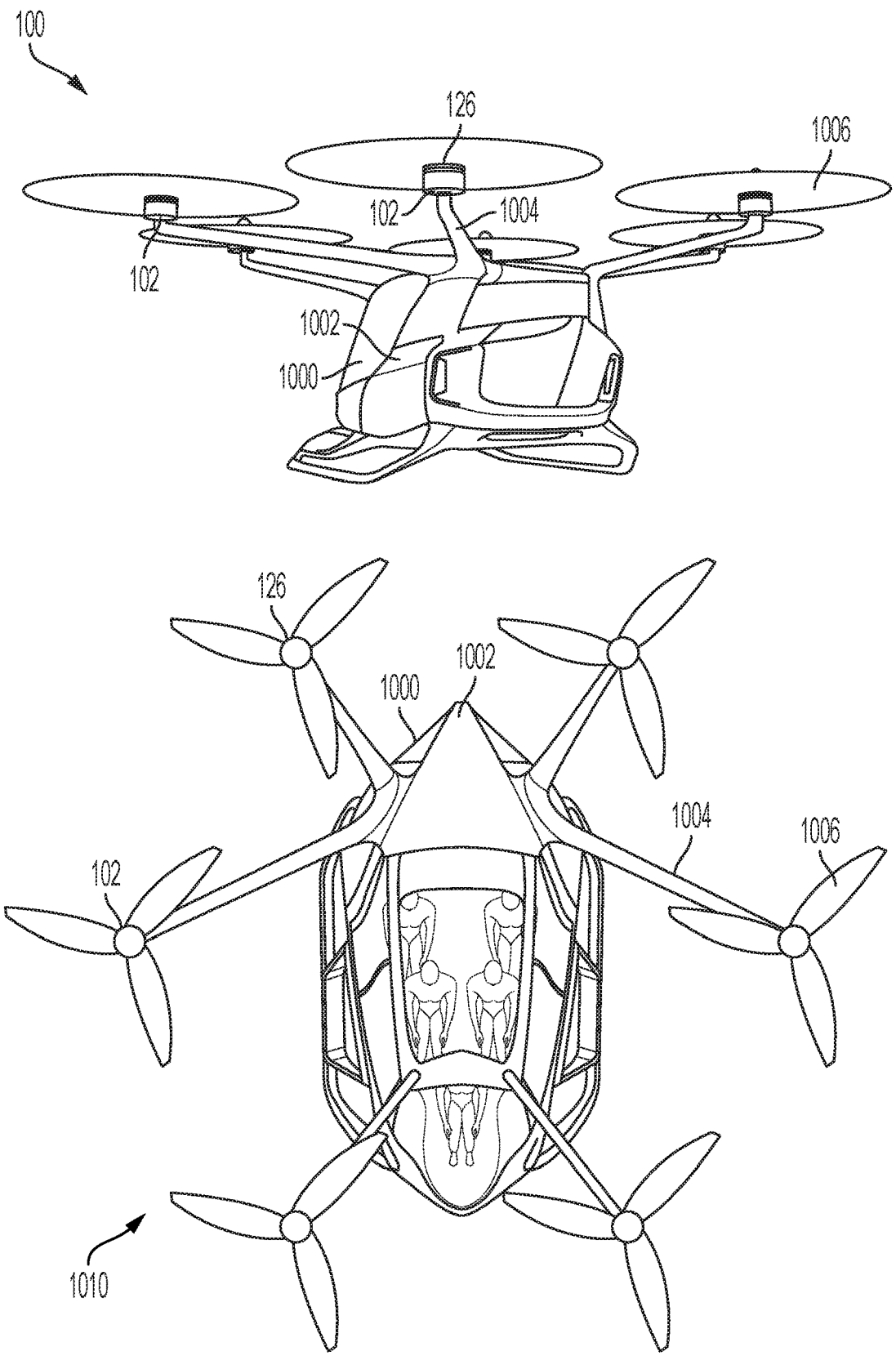
FIG. 23 depicts side and top views of a multirotor aircraft with six rotors cantilevered from the frame of the multirotor aircraft in accordance with an embodiment of the present invention, indicating the location and compartments housing the fuel supply and power generation subsystems; electrical and systems connectivity of various fuel supply, power generation, and motor control components of a system of the invention.

FIG. 21-FIG. 23 depict profile diagrams demonstrating alternative example positions of fuel supply subsystems and power generation subsystems within the multirotor aircraft 1000, including heat transfer and heat exchange components comprising cooling bodies 102, and systems connectivity of various fuel supply, power generation, and motor control components of the invention. Example embodiments of the configuration of power generation subsystem including heat transfer and cooling source 1010 components within the multirotor aircraft 1000 that depicts views demonstrating the position and compartments housing the fuel supply and power generation subsystems together with coolant fluid conduits 142. The power generation subsystem may have various numbers of fuel cells based on the particular use configuration, for example a set of hydrogen fuel cells. Operation and control of the cells is enabled via CAN protocol or a similar databus or network or wireless or other communications means. Flight control algorithm will modulate and monitor the power delivered by fuel cells via CAN. FIG. 23 depicts two views demonstrating the position of the array of propellers 1006 extending from the frame of the multirotor aircraft 1006 airframe fuselage 1002 and elongate support arms 1008 with an approximately annular configuration. In accordance with an example embodiment of the present invention, the multiple electric motors 126 are supported by the elongate support arms 1008, and when the aircraft 1000 is elevated, the elongate support arms 1008 support (in suspension) the aircraft 1000 itself. Side and top views of a multirotor aircraft 1000 depict six rotors (propellers 1006) cantilevered from the frame of the multirotor aircraft 1000 in accordance with an embodiment of the present invention, indicating the location of the airframe fuselage 1002, attached to which are the elongate support arms 1008 that support the plurality of motor 126 and propeller 1006 assemblies wherein the cooling bodies 102 are clearly shown.

Figure 24:
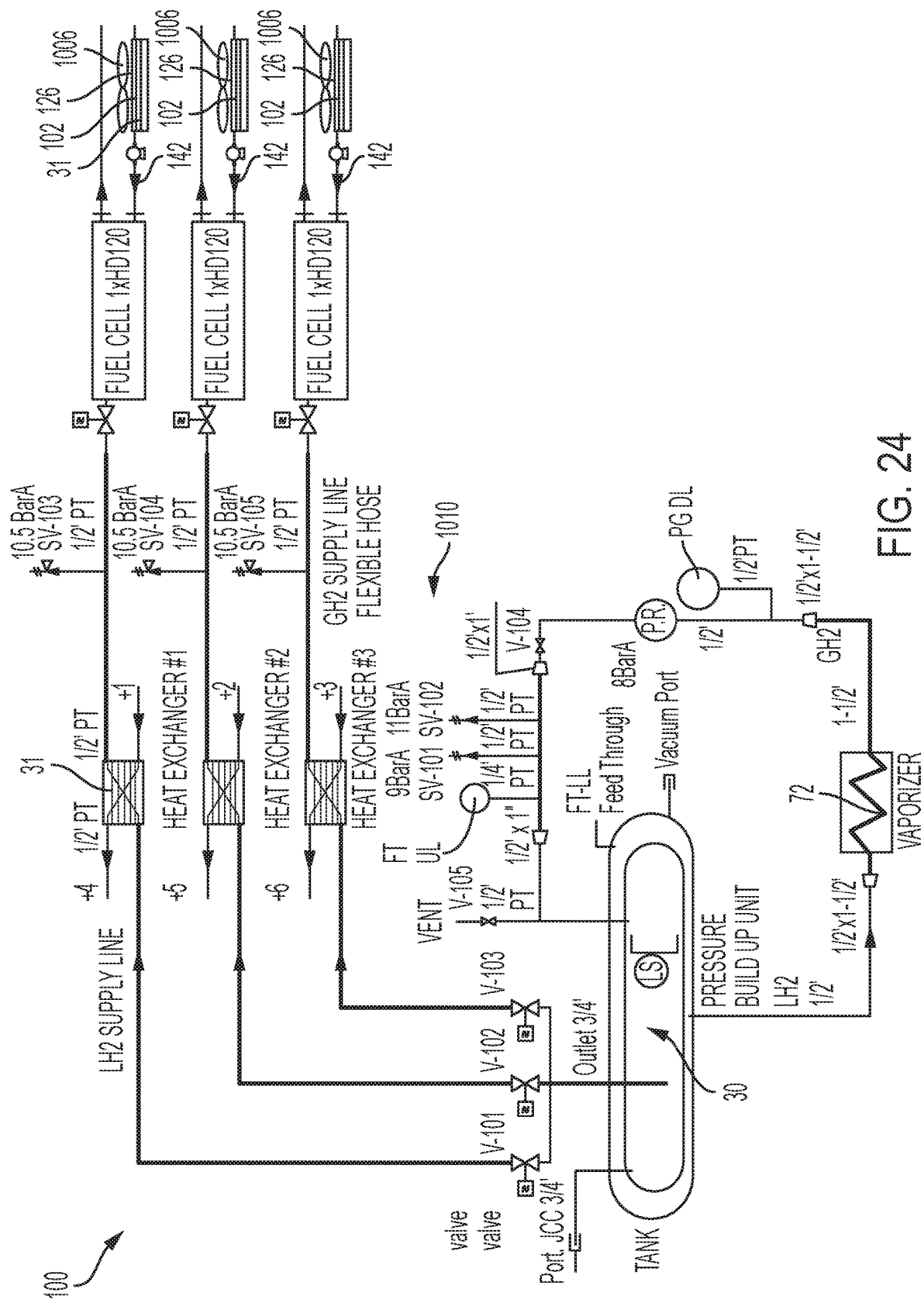
FIG. 24 depicts an example diagram of the fuel tank, fuel cell, radiator, heat exchanger and air conditioning components and interrelated conduits for heat transfer among components.

FIG. 24 depicts an example diagram of the fuel tank, fuel cell, radiator, heat exchanger and air conditioning components along with the most basic components of the power generation subsystem and interrelated conduits for heat transfer among components. The integrated system fuel supply subsystem comprises the $LH_2$ 400 L fuel tank comprising a carbon fiber epoxy shell or a stainless steel or other robust shell, a plastic or metallic liner, a metal interface, crash/drop protection, together with pressure build up unit, $LH_2$ Alt Port, refueling port, pressure gauge w/switch contact, pressure trans/level/vacuum gauge/pressure regulator, spare port, ¼"sensor (Liquid detection) and mating parts A, B and C. Mating part C includes at least one 1 inch union (to interface with heat exchangers) as well as ½"safety valves, vaporizer or heating components for converting $LH_2$ to $GH_2$, fuel lines, and vessels and piping that routed to a heat exchanger or are otherwise in contact with fluid conduits for fuel cell coolant 118 water. Mating part A includes at least one fuel supply coupling or at least one fuel transfer coupling for charging or refueling connections for charging; $LH_2$ refueling port (female fuel transfer coupling). Mating part B includes a ⅜" B (Vent); 1 bar vent for charging; self-pressure build up unit; at least two safety relief valves. Each part is in fluid communication with the one or more fuel cells, and fuel tank configured to store and transport a fuel selected from the group consisting of gaseous hydrogen ($GH_2$), liquid hydrogen ($LH_2$), or similar fluid fuels. The one or more temperature sensing devices or thermal safety sensors monitor temperatures and concentrations of gases in the fuel supply subsystem, and also comprise one or more pressure gauges, one or more level sensors, one or more vacuum gauges, and one or more temperature sensors.

In accordance with one embodiment, the cooling system comprises heat exchangers and radiators configured for fuel cell modules, motors, motor controllers, and electronics cooling by heat transfer. Heat exchangers each comprise tubes, unions, vacuum ports/feed through and vents. The vaporizer may be interconnected by fluid conduits 142, pipes or tubes to a heat exchanger, or may function as a heat exchanger itself by contacting fluid coolant 118 and fluid conduits 142. In one embodiment, the heat exchangers may further comprise lightweight aluminum heat exchangers or compact fluid heat exchangers that transfer energy/heat from one fluid to another more efficiently by implementing different principles related to thermal conductivity, thermodynamics in general and fluid dynamics. Such fluid heat exchangers use the warm and/or hot fluid coolant 118 normally flowing inside a fluid conduit 142 and high pressure lines. Heat energy is transferred by convection from the fluid (coolant 118) in the fluid conduits 142 as it flows through the system, wherein the moving fluid contacts the inner wall of the fluid conduits 142 with a surface of a different temperature and the motion of molecules establishes a heat transfer per unit surface through convection. Then in thermal conduction heat spontaneously flows from a hotter fluid conduit 142 to the cooler flow tubes, conduits 142 or high pressure lines over the areas of physical contact between the two components within the heat exchanger body. Heat energy is then transferred by convection again from the inner wall of the inflow tubes/fuel conduits 142/fuel lines 142 to fluid in the pressure line 142 flowing by contacting the surface area of the inner wall of the fuel flow tubes/fuel conduits 142/fuel lines 142.

Heat exchangers may be of standard flow classifications including: parallel-flow; counter-flow; and cross-flow. Heat exchangers may be shell and tube, plate, fin, spiral and combinations of said types, and may be comprised of one of copper, stainless steel, and alloys and combinations thereof, or other conductive material. Connection may be made using any known method of connecting pipes. The measuring of thermodynamic operating conditions comprises measuring a first temperature corresponding to one or more sources of thermal energy and assessing one or more additional temperatures corresponding to thermal references, and wherein the one or more thermal references comprise one or more references selected from the group consisting of operating parameters, warning parameters, equipment settings, occupant control settings, alternative components, alternative zones, temperature sensors, and external reference information. The one or more sources are selected from the group consisting of the power generation subsystem, the external temperature zone, and the fuel supply subsystem.

The one or more thermal energy destinations are selected from the group consisting of the power generation subsystem, the internal temperature zone, the external temperature zone, and the fuel supply subsystem. In one embodiment, the fuel cell control system comprises 6 motors and 3 fuel cell modules, where redundant connections allow any two of the 3 fuel cells to provide power to all 6 motors.

Also depicted are the at least one radiator, coolant outlet, example fuel cell module, coolant inlet, air flow sensing and regulation, and coolant (cooling water circulation) pump. The thermal energy control subsystem 1010 is configured to connect to a first fluid conduit 142 in connection with and in fluid communication the fuel supply subsystem comprising the fuel, and a second conduit in connection with and in fluid communication with the power generation subsystem comprising the fluid coolant 118, wherein thermal energy is transferred from the coolant, across a conducting interface by conduction, and to the fuel, thereby warming the fuel and cooling the coolant, and wherein the one or more temperature sensing devices or thermal energy sensing devices further comprises a fuel temperature sensor and a coolant temperature sensor. Additional components include at least one vacuum sensor and port, and a level sensor feed through. the fuel supply subsystem further comprises various components including, but not limited to, pressure transmitters, level sensors, coolant circulation pumps, and pressure regulators solenoid valves, used to monitor, direct, reroute, and adjust the flow of coolant through the coolant conduits in the proper manner to supply the power generation subsystem (with example fuel cell modules). In one embodiment, the fuel may be served by separate coolant (e.g. in fluid communication with heat exchangers) from the power generation subsystem (with example fuel cell modules), and in another embodiment, the fuel supply subsystem shares a cooling loop or circuit comprising coolant conduits transporting coolant with the power generation subsystem (with example fuel cell modules), and in an additional embodiment, the fuel supply subsystem may include fuel lines that serve as coolant conduits for various components including the power generation subsystem (with example fuel cell modules), either via thermal conductive contact or indirect contact by e.g. the one or more heat exchangers. The autopilot control unit or a computer processor are further configured to operate components of the subsystems and compute, select and control, based on the temperature adjustment protocol, an amount and distribution of thermal energy transfer including: from the one or more sources comprising the power generation subsystem, to the one or more thermal energy destinations including: the external temperature zone (using at least the at least one radiator or the one or more exhaust ports), and the fuel supply subsystem (using the thermal energy control subsystem 1010 comprising the heat exchangers or a vaporizer). Distribution may occur from the one or more sources to the one or more thermal energy destinations comprising the fuel supply subsystem, using the fluid conduits 142 or HVAC subsystems.

The thermal interface of the thermal energy control subsystem 1010 is important for interconnecting multiple subsystems and components located far apart on the aircraft 1000 and facilitating the use of working fluids to transport heat and thermal energy for transfer to various destinations. The thermal interface further comprises one or more heat exchangers configured to transfer heat or thermal energy from the fluid coolant 118 supplied by coolant fluid conduits 142 in fluid communication with the one or more heat exchangers across heat exchanger walls and heat exchanger surfaces, to the fuel supplied by high pressure lines in fluid communication with the one or more heat exchangers, using thermodynamics including conduction, wherein the fluid coolant 118 and the fuel remain physically isolated from one another. After executing thermal energy transfer from the one or more sources to the one or more thermal energy destinations, the example method repeats measuring, using one or more temperature sensing devices or thermal energy sensing devices, thermodynamic operating conditions in a multirotor aircraft 1000 comprising power generation, fuel supply and related subsystems, and then performs comparing, computing, selecting and controlling, and executing steps data for the one or more fuel cells and the one or more motor control units to iteratively manage operating conditions in the multirotor aircraft 1000.

Figure 25:
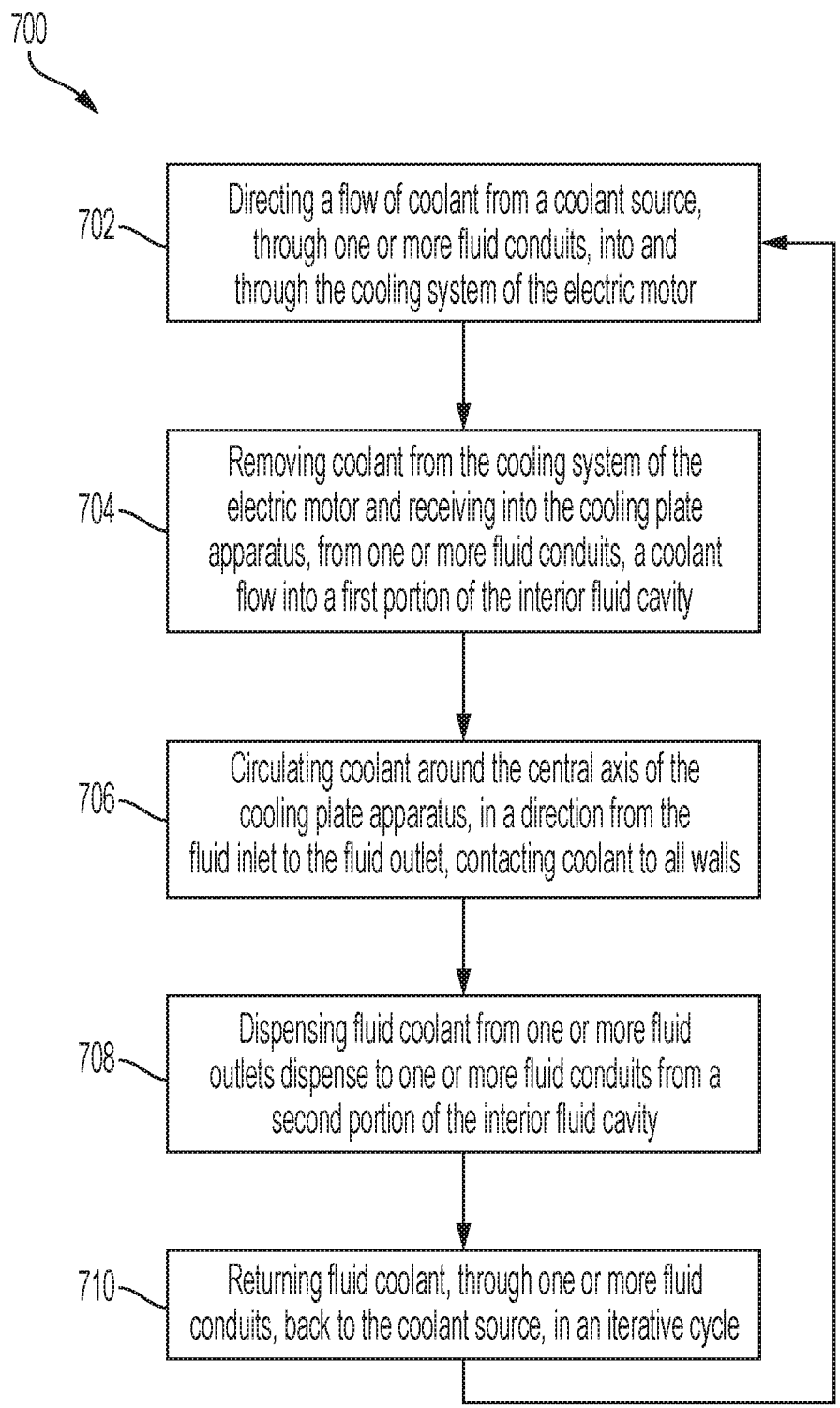
FIG. 25 depicts a flow chart that illustrates the present invention in accordance with one example embodiment.

FIG. 25 depicts a flow chart that illustrates the present invention in accordance with one example embodiment of a method 700 for performing motor 126 cooling using a cooling plate apparatus 100, including simplified form a measurement-analysis-adjustment-control approach that some example embodiments of the invention may employ. The method 700 comprises: at Step 702, directing a flow of fluid coolant 118 from a coolant source 1010 (including a thermal energy control subsystem, heat exchangers therein or one or more heat exchangers in fluid communication with the fuel tank in the fuel supply subsystem, or components of the power supply subsystem including one or more fuel cell modules comprising a plurality of hydrogen fuel cells in fluid communication with the one or more heat exchangers or radiators and in fluid communication with one or more motors 126, motor controllers, and cooling bodies 102), through one or more fluid conduits 142, into and through the cooling system of the electric motor 126. At Step 704, removing fluid coolant 118 from the cooling system of the electric motor 126 and receiving into the cooling plate apparatus 100, from one or more fluid conduits 142 in fluid communication with the motor 126, a fluid coolant 118 flow into a first portion of the interior fluid cavity 116. At Step 706, circulating fluid coolant 118 around the central aperture 124 of the cooling plate apparatus 100, in a direction from the fluid inlet 144 to the fluid outlet 148, wherein the fluid coolant 118 contact all cooling body 102 walls including the top wall 104, base wall 106, hub wall 108, perimeter wall 110, partition wall 112 and aperture wall 114. At Step 708, dispensing fluid coolant 118 from one or more fluid outlets 148 to one or more fluid conduits 142 from a second portion of the interior fluid cavity 116 fitted with an outlet fitting 150 (matching and mating with the proper bore 120). The system performs, at Step 710, returning fluid coolant 118 through one or more fluid conduit 142 back to the coolant source 1010, restarting the iterative cycle, thereby cooling the power generation subsystem supplying voltage and current in an electrical circuit comprising a plurality of motor controllers configured to control a plurality of motor 126 and propeller 1006 assemblies in a multirotor aircraft 1000. At the source 1010, excess heat generated by the function of the fuel cells, motor controllers and motors 126 can be expelled with exhaust gas and/or $H_2O$, dissipated through use of one or more coolant filled radiators cooled by forced airflow over the radiators, or supplied by a working fluid in fluid conduits used by one or more heat exchangers to extract $GH_2$ from $LH_2$ through thermal energy transfer that heats the $LH_2$ without direct interface between the two different fluids. As the process steps of the invention are performed iteratively to produce electricity, heat or thermal energy (including heated fluid coolant 118) and $H_2O$ vapor are generated and transferred on an ongoing basis.

In alternative embodiments, the coolant source 1010 and power generation subsystem may comprise engines, generators, batteries or other power sources known in the art instead of fuel cells, with the steps for heat transfer and dissipation functioning the same. The executing of a thermal energy transfer from the power generation subsystem to one or more thermal energy destinations, using the autopilot control units or computer processors, may comprise using a fluid in fluid communication with a component of the power generation subsystem to transport heat or thermal energy to a different location corresponding to a thermal energy destination, thereby reducing the temperature or excess thermal energy of the one or more sources. To accomplish this the processor selects a source and thermal energy destination pair, and retrieves stored routing data for the pair, then activates, actuates, or adjusts the appropriate valves, regulators, conduits, and components to send a working fluid, including the fluid coolant 118, through the aircraft 1000 directing the flow of fluid from the source to the one or more thermal energy destinations. For example, if the temperature adjustment protocol indicates a fuel cell module receiving heated fluid from a motor 126 and cooling body 102 requires dissipation and transfer of waste heat, the processor may select the fuel supply subsystem as a thermal energy destination, and the processor will actuate the coolant pump and appropriate valves in fluid communication with the fluid coolant conduits 142 connected to and in fluid communication with that fuel cell module, so that fluid coolant 118 is moved from the fuel cell module, through the fluid coolant conduits 142 and piping along a route that leads to a heat exchanger, and in turn similarly actuates pumps and valves 88 in the fuel lines 85, such that coolant 31 and fuel 30 flow through separate conduits of the processor activated heat exchanger 57 simultaneously and heat or thermal energy is transferred from the hotter coolant 31, across the conduits, walls and body of the heat exchanger 57, and into the colder fuel 30, thereby reducing the temperature of the fuel cell module 18 source and increasing the temperature of the fuel 30, or more generally the fuel supply subsystem. The executing thermal energy transfer from the one or more sources to the one or more thermal energy destinations may further comprise diverting fluid flow of the fuel 30 or the coolant 31 using valves 88 and coolant pumps 76, wherein the coolant 31 may comprise water and additives (such as anti-freeze). As the processors continue to measure the fuel cell module 18, processors may divert flow to other thermal energy destinations or reduce flow to the heat exchanger or stop flow to the heat exchanger and redirect the flow to a different thermal energy destination.

In an alternative embodiment, one or more of a cooling plate apparatus 100 or cooling bodies 102 therein that are in fluid communication with both one or more motors 126 and a coolant source 1010 including a power generation subsystem may be used as the radiator performing heat transfer and management for those systems without need of additional radiators, heat exchangers, vents, or other means of heat dissipation. In each example embodiment, multiple processors may work together to perform different functions to accomplish energy transfer tasks. The integrated system iteratively or continuously measures the components, zones and subsystems to constantly adjust energy transfer and temperature performance of the aircraft 1000 to meet design and operating condition parameters. Measuring, using one or more temperature sensing devices or thermal energy sensing devices, thermodynamic operating conditions in a multirotor aircraft 1000 comprising a first temperature corresponding to a source of thermal energy and one or more additional temperatures corresponding to thermal references further comprise measuring one or more selected from the group consisting of a fuel temperature, a fuel tank temperature, fuel cell or fuel cell module temperatures, battery temperatures, motor controller temperatures, a coolant temperature or peak controller temperature, motor temperatures, or peak motor temperature or aggregated motor temperature, radiator 60 temperatures, a cabin temperature, and an outside-air temperature. The temperature adjustment protocols may be computed by the example method 700 and integrated system using autopilot control units 32 or computer processor and an algorithm based on the comparison result. The selecting and controlling, based on the temperature adjustment protocol, of an amount and distribution of thermal energy transfer from the one or more sources further comprises ordering the one or more thermal energy destinations, selecting and controlling, based on the temperature adjustment protocol, an amount and distribution of thermal energy transfer from the one or more sources, to bring that source to an improved operating temperature.

The methods 700 and systems described herein are not limited to a particular aircraft 1000 or hardware or software configuration, and may find applicability in many aircraft or operating environments. For example, the algorithms described herein can be implemented in hardware or software, or a combination thereof. The methods 700 and systems 100 can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: a mission control tablet computer 36, mission planning software 34 program, throttle pedal, sidearm controller, yoke or control wheel, or other motion-indicating device capable of being accessed by a processor, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

As provided herein, the processor(s) can thus in some embodiments be embedded in three identical devices that can be operated independently in a networked or communicating environment, where the network can include, for example, a Local Area Network (LAN) such as Ethernet, or serial networks such as RS232 or CAN. The network(s) can be wired, wireless RF, or broadband, or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices to perform the necessary algorithms and determine the appropriate vehicle commands, and if implemented in three units, the three units can vote among themselves to arrive at a 2 out of 3 consensus for the actions to be taken. As would be appreciated by one skilled in the art, the voting can also be carried out using another number of units (e.g., one two, three, four, five, six, etc.). For example, the voting can use other system-state information to break any ties that may occur when an even number of units disagree, thus having the system arrive at a consensus that provides an acceptable level of safety for operations.

The device(s) or computer systems that integrate with the processor(s) for displaying presentations can include, for example, a personal computer with display, a workstation (e.g., Sun, HP), a personal digital assistant (PDA) or tablet such as an iPad, or another device capable of communicating with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment(s), and thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. References to a network, unless provided otherwise, can include one or more networks, intranets and/or the internet.

Although the methods and systems have been described relative to specific embodiments thereof, they are not so limited. For example, the methods and systems may be applied to a variety of vehicles having 6, 8, 10, 12, 14, 16, or more independent motor controllers and motors 126, thus providing differing operational capabilities. The system may be operated under an operator's control, or it may be operated via network or datalink from the ground. Many modifications and variations may become apparent in light of the above teachings and many additional changes in the details, materials, and arrangement of parts, herein described and illustrated, may be made by those skilled in the art.

What is claimed is:

1. A cooling plate apparatus, comprising:
   a cooling body further comprising:
      a top wall offset in an axial direction from a base wall;
      a hub wall interposed between the top wall and the base wall;
      a perimeter wall offset from the hub wall at a greater offset distance from a central axis than the hub wall, wherein the perimeter wall is interposed between the top wall and the base wall, connecting a perimeter of the top wall to a perimeter of the base wall;
      the top wall, the base wall, the hub wall, the perimeter wall and the cooling body each comprising a heat conducting material;
      an interior fluid cavity configured to hold and enable circulation fluid coolant, wherein the interior fluid cavity is defined by and disposed within an interior surface of the hub wall, an interior surface of the top wall, an interior surface of the base wall, and an interior surface of the perimeter wall;
      a partition wall interposed between the top wall and the base wall, the partition wall configured to separate portions of the interior fluid cavity and enable a directional flow through the interior fluid cavity, and an aperture wall isolating the interior fluid cavity from a pass-through conduit for electrical wires that pass through and connect to an electric motor; and
   a plurality of fasteners configured to fit a subset of a plurality of bores in the cooling body, the plurality of bores further defining one or more fluid inlets receiving fluid coolant into a first portion of the interior fluid cavity, and one or more fluid outlets dispensing fluid coolant from a second portion of the interior fluid cavity;
   wherein the cooling plate apparatus is indirectly coupled to a cooling system of the electric motor, wherein the cooling body is interconnected with heat conducting components of the electric motor, thereby transferring heat from the electric motor to the cooling body by surface contact and conduction using the top wall, the subset of bores and the fasteners, wherein cooled fluid coolant is recirculated and the cooling plate apparatus generates a flow of fluid coolant through interconnected components in fluid communication comprising:
      a coolant source, comprising one or more of coolant pumps, coolant reservoirs, coolant junctions, or coolant outlets;
      an inlet line comprising a high-pressure line or fluid conduit that is removably connected to, and in fluid communication with, at a first end, the coolant source, comprising one or more of coolant pumps, coolant reservoirs, coolant junctions, or coolant outlets, and at a second end, an inlet fitting of the one or more fluid inlets of the cooling body configured to receive fluid coolant into the interior fluid cavity of the cooling body;
      a central axis of the cooling plate apparatus, circulating within the interior fluid cavity in a direction from the fluid inlet to the fluid outlet, maintaining fluid contact with one or more of an interior surface of the hub wall, an interior surface of the top wall, an interior surface of the base wall, an interior surface of the perimeter wall, an interior surface of the partition wall, an interior surface of an aperture wall, or combinations thereof;
      the interior fluid cavity of the cooling body of the cooling plate apparatus via a fluid outlet removably connected to, and in fluid communication with, a first end of an outlet line comprising a high-pressure line or fluid conduit via a fluid outlet fitting, wherein a second end of the outlet line is removably connected to, and in fluid communication with, the coolant source; and
      thereby directing a flow of coolant from the coolant source, through the inlet line, into the cooling plate apparatus, into the interior fluid cavity of the cooling body of the cooling plate apparatus via the one or more fluid inlets, around the central axis of the cooling plate apparatus, in a direction from the fluid inlet to the fluid outlet, out of the interior fluid cavity via the fluid outlet through an outlet line via the fluid outlet fitting, back to the coolant source, cooling the electric motor and parts thereof by conduction, convection, radiation, and thereby transporting heat from the electric motor in an iterative cycle.

2. The cooling plate apparatus of claim 1, further comprising a central aperture extending through the cooling plate apparatus, through the top wall and through the base wall, aligning with a central axis of an electric motor and/or driveshaft or propeller shaft thereof, surrounded and defined by an exterior surface of the hub wall; and one or more fluid conduit bores isolating fluid coolant flowing into the electric motor from the interior fluid cavity.

3. The cooling plate apparatus of claim 1, wherein the cooling plate apparatus removably connects to the electric motor by attaching a top surface of the cooling plate apparatus to a housing or bottom of a stator of the electric motor, making heat conductive contact using a first set of fasteners of the plurality of fasteners to create a heat conducting junction between the electric motor and the cooling plate apparatus.

4. The cooling plate apparatus of claim 3, wherein the first set of fasteners of the plurality of fasteners each comprise a bolt, extending through both the top wall and the base wall of the cooling body using a bore of a first subset of the plurality of bores and threaded to mate with a motor bore disposed within a housing or bottom of a stator of the electric motor, wherein the first subset of bores of the plurality of bores are concentric with and of a same diameter as a plurality of motor bores in the electric motor.

5. The cooling plate apparatus of claim 3, wherein the first set of fasteners or a second set of fasteners of the plurality of fasteners extend through, and attach the cooling plate apparatus to, one or more of a support bracket, an elongate support arm, a support armature or an airframe fuselage, wherein the second set of fasteners each comprise a bolt, extending through the base wall of the cooling body but not the top wall and threaded to mate with a second subset of the plurality of bores comprising blind bores having threads and terminating inside one or more of the hub wall or the cooling body.

6. The cooling plate apparatus of claim 1, wherein the plurality of fasteners each comprise a heat conducting material.

7. The cooling plate apparatus of claim 1, wherein the cooling plate apparatus comprises the aperture wall having an exterior surface that surrounds and defines a pass through aperture dimensioned, and disposed to enable electrical wires to pass through the cooling plate apparatus, wherein the aperture wall isolates the interior fluid cavity from the pass through aperture, with an interior surface of the aperture wall further defining the interior fluid cavity, and wherein the electrical wires comprise power transmission wires or signal transmission wires to connect the electric motor or to connect motor sensors to one or more of an electricity generating source subsystem or a diagnostic subsystem.

8. The cooling plate apparatus of claim 1, wherein the interior surface of the hub wall is contiguous with an interior surface of the partition wall.

9. The cooling plate apparatus of claim 1, wherein the interior surface of the hub wall is contiguous with an interior surface of the aperture wall.

10. The cooling plate apparatus of claim 1, wherein the top wall is parallel to the base wall.

11. The cooling plate apparatus of claim 1, wherein the hub wall and perimeter wall are annular in cross-section, the top wall and the base wall each have a circular perimeter, and the hub wall is concentric with the perimeter wall.

12. The cooling plate apparatus of claim 1, the hub wall and the perimeter wall have a wall thickness less than a maximum/outer radius of the cooling plate apparatus, and wherein the hub wall is concentric with the perimeter wall.

13. The cooling plate apparatus of claim 1, wherein the hub wall, the perimeter wall, the partition wall and an aperture wall each have an axial height of an axial distance of an offset between the top wall and the base wall and each join a top surface of a base plate at a perpendicular angle, and each join a bottom surface of a top plate at a perpendicular angle.

14. The cooling plate apparatus of claim 1, wherein the interior surface of the hub wall is contiguous with an interior surface of the perimeter wall, partition wall, and aperture wall.

15. The cooling plate apparatus of claim 1, further comprising one fluid inlet of the one or more fluid inlets to receive fluid coolant into the interior fluid cavity, the interior fluid cavity shaped to transport the fluid coolant around a central axis of the cooling plate apparatus and dispense fluid coolant out of one fluid outlet of the one or more fluid outlets, wherein the fluid coolant flowing in from the one fluid inlet is prevented from mixing with the fluid coolant flowing out of the one fluid outlet by the partition wall.

16. The cooling plate apparatus of claim 1, wherein the cooling plate apparatus is a heat sink for the electric motor, transferring heat generated by the electric motor by convection, radiation, and/or conduction from the electric motor through the cooling body and then into fluid coolant circulating inside the interior fluid cavity or out into an external environment surrounding the cooling plate apparatus.

17. The cooling plate apparatus of claim 1, wherein the heat conducting material further comprises a heat conducting alloy.

18. The cooling plate apparatus of claim 17, wherein the heat conducting alloy is one of titanium, aluminum, or combinations thereof.

19. The cooling plate apparatus of claim 18, wherein a first part of the cooling body comprising the top wall is machined from a first piece of heat conducting alloy and disposed to fit in a fluid-tight configuration with a second part of the cooling body comprising the base wall that is machined from a second piece of heat conducting alloy, wherein first part is then connected to the second part of the cooling body.

20. The cooling plate apparatus of claim 19, wherein the base wall of the cooling body and/or the top wall of the cooling body further comprise one or more coupling structures to mate the base wall to the top wall.

21. The cooling plate apparatus of claim 19, wherein the first part is fastened to the second part of the cooling body using a third set of the plurality of fasteners, each comprising a bolt, extending through the base wall of the cooling body but not the top wall and threaded to mate with a third subset of the plurality of bores comprising blind bores having threads and terminating inside one or more of the perimeter wall, the hub wall or the cooling body.

22. The cooling plate apparatus of claim 21, wherein the cooling body comprises the first part and the second part both constructed of the heat conducting alloy comprising aluminum with the first part coupled to the second part, the second part comprising a recessed cavity creating the internal fluid cavity, wherein a gasket creating a fluid seal is interposed between the first part and the second part when the first part is coupled to the second part.

23. The cooling plate apparatus of claim 18, wherein the cooling plate apparatus is formed as a single part from the heat conducting alloy using a three-dimensional printing tool or technique.

24. The cooling plate apparatus of claim 1, wherein at least a first subset of the plurality of bores is disposed within or through the hub wall at equal radial distances from a central axis of the cooling plate apparatus with a uniform spacing comprising equal distances between a center axis of each bore of the first subset to a center axis of an adjacent bore of the first subset of the plurality of bores.

25. The cooling plate apparatus of claim 1, wherein a fourth subset of the plurality of bores of the cooling plate apparatus comprises conduit bores configured to connect fluid conduits or electrical wires and connections thereof to the electric motor.

26. The cooling plate apparatus of claim 1, wherein the interior fluid cavity contains and circulates a liquid coolant.

27. The cooling plate apparatus of claim 1, wherein the interior fluid cavity contains and circulates a liquid coolant comprising water or an anti-freeze combination of water and ethylene glycol.

28. The cooling plate apparatus of claim 27, wherein when the cooling plate apparatus is in fluid communication with a cooling system or fluid circulation system of the electric motor, wherein heated fluid coolant from the electric motor is circulated through the cooling plate apparatus using the interior fluid cavity to cool the heated fluid coolant by thermal energy transfer using convection, radiation, and/or conduction, wherein cooled fluid coolant is thereafter recirculated into the cooling system or fluid circulation system of the electric motor.

29. The cooling plate apparatus of claim 28, further comprising one or more fluid outlets that dispense fluid coolant to one or more high-pressure lines or fluid conduits through a fluid outlet fitting joining the one or more high-pressure lines or fluid conduits to a sixth subset of the plurality of bores, thereby forming a fluid tight conduit through the base wall into a second portion of the interior fluid cavity.

30. The cooling plate apparatus of claim 29, further comprising a plurality of fluid inlets, a plurality of inlet lines, a plurality of fluid outlets, and a plurality of outlet lines, the plurality of fluid inlets and the plurality of fluid outlets each disposed within the cooling body enabling fluid to pass into and out of the interior fluid cavity, wherein the cooling plate apparatus is further configured to generate a flow of fluid coolant through each of the plurality of inlets and the plurality of outlets.

31. The cooling plate apparatus of claim 1, wherein the cooling plate apparatus is in fluid communication with one or more of coolant pumps, coolant reservoirs, coolant junctions, coolant inlets or coolant outlets by using one or more high-pressure lines or fluid conduits that are removably connected to and in fluid communication with the cooling plate apparatus via fluid inlet fittings or fluid outlet fittings.

32. The cooling plate apparatus of claim 31, further comprising one or more fluid inlets that receive fluid coolant from one or more high-pressure lines or fluid conduits through a fluid inlet fitting joining the one or more high-pressure lines or fluid conduits to a fifth subset of the plurality of bores, thereby forming a fluid tight conduit through the base wall into the first portion of the interior fluid cavity.

33. The cooling plate apparatus of claim 32, wherein the cooling plate apparatus enables a flow of fluid coolant through interconnected components in fluid communication comprising:
 a coolant source, comprising one or more of coolant pumps, coolant reservoirs, coolant junctions, or coolant outlets;
 an inlet line comprising a high-pressure line or fluid conduit disposed through a fluid conduit bore of a fourth subset of the plurality of bores that is removably connected to, and in fluid communication with, at a first end, the coolant source, comprising one or more of coolant pumps, coolant reservoirs, coolant junctions, or coolant outlets, and at a second end, an inlet of a cooling system or fluid circulation system of the electric motor, using a throughlet fitting;
 a first intermediate line comprising a high-pressure line or fluid conduit disposed through another fluid conduit bore of the fourth subset of the plurality of bores that is removably connected to, and in fluid communication with, at a first end, an outlet of the cooling system or fluid circulation system of the electric motor using a throughlet fitting, and at a second end, an inlet fitting of the one or more fluid inlets of the cooling body configured to receive fluid coolant into the interior fluid cavity of the cooling body of the cooling plate apparatus;
 the interior fluid cavity shaped to circulate fluid coolant around a central axis of the cooling plate apparatus in a direction from the fluid inlet to the fluid outlet while maintaining fluid contact with one or more of an interior surface of the hub wall, an interior surface of the top wall, an interior surface of the base wall, an interior surface of the perimeter wall, an interior surface of the partition wall, an interior surface of an aperture wall, or combinations thereof;
 an outlet line comprising a high-pressure line or fluid conduit removably connected to, and in fluid communication with, at a first end, a fluid outlet of the interior fluid cavity of the cooling body of the cooling plate apparatus via a fluid outlet fitting, and at a second end of the outlet line, the coolant source; and
 thereby directing a flow of coolant from the coolant source, through the inlet line, through the cooling system or fluid circulation system of the electric motor; from the cooling system or fluid circulation system of the electric motor into the cooling plate apparatus, through the first intermediate line, into the interior fluid cavity of the cooling body of the cooling plate apparatus via the one or more fluid inlets, around the central axis of the cooling plate apparatus, in a direction from the fluid inlet to the fluid outlet, out of the interior fluid cavity via the fluid outlet through an outlet line via a fluid outlet fitting, back to the coolant source, cooling the electric motor and parts thereof by conduction, convection, radiation, and thereby transporting unheated fluid coolant to, and heated coolant from, the electric motor in an iterative cycle.

34. The cooling plate apparatus of claim 1, further comprising a seventh subset of bores disposed into or through the perimeter wall, defining one or more of fluid inlets, fluid outlets, fluid conduit bores, or sensor ports.

35. The cooling plate apparatus of claim 1, wherein the electrical wires that pass through and connect to the electric motor comprise one or more of power supply wires, three phase power connectors, temperature sensors, hall sensors, speed and position sensors, resolvers, tandem resolvers, encoders, sensors for synchronizing electrical and mechanical motor angle, or sensors for controlling position, direction and rotation speed of the electric motor; and wherein additional wires of the electrical wires pass through a central aperture extending through the cooling plate apparatus or the pass-through conduit for electrical wires.

* * * * *